United States Patent
Suzuki et al.

(10) Patent No.: US 6,879,845 B2
(45) Date of Patent: Apr. 12, 2005

(54) WIRELESS COMMUNICATION METHOD AND SYSTEM USING BEAM DIRECTION-VARIABLE ANTENNA

(75) Inventors: Toshiro Suzuki, Tama (JP); Ken Takei, Kawasaki (JP); Satoshi Takahashi, Yokohama (JP); Hiroshi Usami, Yokohama (JP); Yuuji Ishida, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 611 days.

(21) Appl. No.: 09/930,134

(22) Filed: Aug. 16, 2001

(65) Prior Publication Data

US 2002/0068590 A1 Jun. 6, 2002

(30) Foreign Application Priority Data

Dec. 1, 2000 (JP) ........................................ 2000-367621

(51) Int. Cl.⁷ .............................................. H04M 1/00
(52) U.S. Cl. ................... 455/562.1; 455/63.4; 455/446; 370/321
(58) Field of Search ............................. 455/403, 422.1, 455/446, 466, 524, 526, 562.1, 575.7, 63.4; 370/321, 337, 347, 442

(56) References Cited

U.S. PATENT DOCUMENTS

| | | | | |
|---|---|---|---|---|
| 4,317,229 A | * | 2/1982 | Craig et al. ............... | 455/277.1 |
| 5,307,507 A | * | 4/1994 | Kanai ......................... | 455/447 |
| 5,983,101 A | * | 11/1999 | Billstrom .................. | 455/452.2 |
| 6,058,318 A | * | 5/2000 | Kobayakawa et al. ... | 455/562.1 |
| 6,542,746 B1 | * | 4/2003 | Dean .......................... | 455/447 |
| 6,557,869 B2 | * | 5/2003 | Gillette et al. ........... | 280/47.28 |
| 6,577,869 B1 | * | 6/2003 | Garrison .................... | 455/447 |
| 6,707,798 B1 | * | 3/2004 | Klein et al. ................ | 370/280 |
| 6,748,218 B1 | * | 6/2004 | Johnson et al. ............ | 455/446 |
| 2001/0012780 A1 | * | 8/2001 | Edwards .................... | 455/446 |

FOREIGN PATENT DOCUMENTS

| | | |
|---|---|---|
| JP | A-8-289366 | 11/1996 |
| JP | A-10-248086 | 9/1998 |
| JP | A-2000-59287 | 2/2000 |
| JP | 2000-59287 | 2/2000 |
| KR | 1999-0071961 | 9/1999 |
| WO | WO 97/21276 | 6/1997 |

OTHER PUBLICATIONS

IEEE Communications Magazine vol. 38 pp. 70–77 (Jul. 2000).

* cited by examiner

Primary Examiner—CongVan Tran
(74) Attorney, Agent, or Firm—Antonelli, Terry, Stout & Kraus, LLP

(57) ABSTRACT

In a time-division multiplexing wireless communication system, an antenna module has plural antenna elements. Receiver high-frequency circuit synthesizes signals from the antenna elements according to an antenna directivity having a desired beam pattern. Demodulator selects one of the received signals from wireless terminals according to the synthesized received signals, and determines transmission beam direction information for use in directing the beam in the selected direction. Weighting circuit generates weight coefficients for setting of the beam patterns and transmission beam directions according to the transmission beam direction information, and produces transmission time slots according to a table listing the relations of the transmission beam directions and the time slots for use in the beam radiation in those directions. Down-link fixed beam-forming circuit and modulator control the antenna module using the generated beam pattern, beam direction and transmission time slots to transmit the down-link signal.

13 Claims, 28 Drawing Sheets

| DISTANCE FROM BASE STATION | NEAR | MEDIUM | FAR |
|---|---|---|---|
| C/I | LARGE | MEDIUM | SMALL |
| MODULATION SYSTEM | 8-LEVEL MODULATION | 4-LEVEL MODULATION | REDUCED-LEVEL MODULATION |
| REDUNDANCE OF ERROR CORRECTION | SMALL | MEDIUM | LARGE |
| INSTANTANEOUS TRANSMISSION SPEED | HIGH | MEDIUM | LOW |

FIG.28

| TIME SLOT | BS1 | | | BS2 | | |
|---|---|---|---|---|---|---|
| | FIRST SECTOR | SECOND SECTOR | THIRD SECTOR | FIRST SECTOR | SECOND SECTOR | THIRD SECTOR |
| A FIG.4 | 330° | 90° | 210° | 60° | 180° | 300° |
| B FIG.5 | 60° | 180° | 300° | 330° | 90° | 210° |
| C FIG.6 | 30° | 150° | 270° | 0° | 120° | 240° |
| D FIG.7 | 0° | 120° | 240° | 30° | 150° | 270° |

FIG.29

| TIME SLOT | BS1 | | | BS2 | | |
|---|---|---|---|---|---|---|
| | FIRST SECTOR | SECOND SECTOR | THIRD SECTOR | FIRST SECTOR | SECOND SECTOR | THIRD SECTOR |
| A FIG.4 | 330° | 90° | 210° | 60° | 180° | 300° |
| B FIG.5 | 60° | 180° | 300° | 330° | 90° | 210° |
| C FIG.6 | 30° | 150° | 270° | 0° | 120° | 240° |
| D FIG.7 | 0° | 120° | 240° | 30° | 150° | 270° |
| E FIG.4 | 330° | 90° | 210° | 60° | 180° | 300° |
| F FIG.7 | 0° | 120° | 240° | 30° | 150° | 270° |

US 6,879,845 B2

WIRELESS COMMUNICATION METHOD AND SYSTEM USING BEAM DIRECTION-VARIABLE ANTENNA

BACKGROUND OF THE INVENTION

The present invention generally relates to a wireless communication method, and particularly to a wireless communication method in a base station system in which channels for a plurality of terminals are multiplexed by time-division multiplexing, and beam direction-variable antennas are provided.

The conventional time-division multiplexing wireless communication system employs the basic principle that the signals to the respective terminals are, respectively, transmitted on different channels using separate time slots, thereby alleviating the crosstalks and interferences between the channels. Therefore, since there is no interference under the same base station due to the simultaneous transmission of signals to a plurality of terminals unlike the code multiplexing system, there is almost no need to use a system for suppressing interferences with other terminals by concentrating the radiated energy on a terminal from a directional antenna such as the so-called smart antenna or adaptive antenna.

SUMMARY OF THE INVENTION

In general, in the system that makes the so-called best effort type communication by controlling the parameters of the channel modulation and coding system-to be optimum values while the degree of the observed interference noise is being taken into account (as, for example, described in "CDMA/HDR: A Bandwidth-Efficient High-Speed Wireless Data Service for Nomadic Users", written by Paul Bender, Peter Black, Matthew Grob, Roberto Padovani, Nagabhushana Sindhushayana, and Andrew Viterbi, IEEE Communications Magazine, Vol. 38, pp. 70–77, July, 2000, hereinafter referred to as HDR (High Data Rate) system), the data rate of communication is determined by the amount of interference noise observed at a terminal. In this system, if the amount of interference noise is small, communication can be performed at a higher data rate. The interference noise observed at this terminal under consideration is not due to the signals transmitted to other terminals from the current base station under communication, but due to only the signals transmitted at the same time to other terminals from a nearby or other base station as long as the time division multiplexing system is used.

FIG. 23 is an illustration of the basic principle of the HDR system. It is generally known that the signal transmitted toward terminals from a base station (hereinafter, called down-link signal) is attenuated in its power in inverse proportion to the distance to the power 3.5 in, for example, large cities. The power of the down-link signal is reduced to a lower level than a signal transmitted from a nearby base station or than an interference signal due to thermal noise or the like as it is transmitted a long way from the base station, and thus the terminal is difficult to normally receive the desired signal. The ratio of this received signal power to the interference power is called the carrier-to-interference ratio, or C/I. When this C/I is high enough at near the base station, a radio signal of, for example, 8-level, or multi-level modulation system is used, and the error correction redundancy is reduced because the radio wave is of high quality, resulting in use of the same bandwidth. Even in this case, the signal can be transmitted at a high bit rate. On the other hand, in an area distant from the base station, the C/I is low, and thus it is necessary to use a reduced-level modulation such as binary system in which error is difficult to occur, and to enhance the error correction capability by increasing the signal redundancy. As a result, the bit rate at which the desired signal can be transmitted is reduced. In the HDR system, the C/I is measured at the terminal before communication begins, and the maximum bit rate that can be used in that area is reported to the base station, thereby eventually achieving the best effort type wireless transmission system.

FIG. 24 is an illustration for the down-link multiplexing system of HDR system. FIG. 25 illustrates an example of the general arrangement of base stations. FIG. 26 is a timing chart of signals transmitted on the down-link of HDR system.

In the HDR system, the multiplexing of this down-link signal is the use of the so-called time division multiplexing system in which the signals to be transmitted toward different terminals are arranged in, for example, N time slots as shown in FIG. 24. In other words, when the base stations are provided as in FIG. 25, the respective base stations radiate radio waves by use of the time slots arbitrarily assigned on a time basis as illustrated in FIG. 26. As illustrated, if the base stations (referred to as BS), for example, BS1 and BS2 simultaneously radiate radio waves from time T1 to time T2, a strong radio interference occurs in a boundary region 3-1 between BS1 and BS2 as indicated by the hatched area in FIG. 25. Consequently, the C/I rates of both signals from BS1 and BS2 are found reduced when measured at a terminal within that region, and thus it is difficult to communicate at a high bit rate.

FIG. 30 is an illustration of the conventional coverage (614.4 kbits/s) of the HDR down-link with the base stations arbitrarily arranged in a square cell shape. When three-sector type HDR base stations each of which has three sectors of a 90-degree wide beam each are respectively disposed at the vertices of each square of 2-km side, the service coverage of a bit rate of 614.4 kbits/s is indicated by the shaded areas in FIG. 30. Here, it is assumed that all the base stations radiate radio waves by use of all time slots. In FIG. 30, as indicated by region 20-5, the sector beam 20-1 of BS1 and the sector beam 20-2 of BS2 interfere with each other, making the service disabled. The region 20-6 is also disabled in service because all the sector beams of BS3 and BS4 are not directed in this direction. In addition, as indicated at the region 20-8, the sector beams 20-1 and 20-7 of BS1 interfere with each other so that the service disabled region deeply enters into the service region near the BS1. The same cut-in portion as at region 20-8 can be observed at, for example, region 20-9.

FIG. 31 is a diagram showing the conventional coverage (204.8 kbits/s) of the HDR down-link with the base stations arbitrarily arranged in a square cell shape. The service area can be given as illustrated when the bit rate is reduced to 204.8 kbits/s under the same conditions, but the service disabled regions still remain even if the bit rate is reduced to that value.

In view of the above points, it is an object of the invention to provide a wireless communication method in the base station system, by which sufficiently high-bit rate communications particularly in the boundary regions between the cells or sectors in the HDR system can be prevented from being made difficult by the interference between the radio waves radiated from the base stations.

It is another object of the invention to provide a wireless communication method that can reduce the areas toward which the sector beams are not directed, and thereby offer a wider service area.

It is still another object of the invention to provide a wireless communication method that can reduce, as much as possible, the degree of the deep entering of the service disabled region into the service area as a result of the interference between a plurality of sector beams.

It is still another object of the invention to provide a wireless communication method that enables the terminal, or user, wherever it is, to always receive a satisfactory radio wave signal that is almost not disturbed by other signals by, for example, controlling the simultaneous radiations of radio waves from the base stations on the HDR down-link to be made in the directions in which they are most difficult to interfere with each other. Accordingly, it is still another object of the invention to make full use of one of the features of the HDR, or the fact that high bit rate communications can be made when the radio interference is small.

The present invention, in order to prevent the radio waves from the respective base stations from interfering with each other, is to control the radio waves interfering with each other not to be radiated at a time, but radiated at different times, thereby avoiding the interference. At this time, the operations of the respective base stations are managed to be precisely synchronized with each other and so that the directions in which the base stations radiate radio waves can be timely switched to avoid the interference, by making use of a system that can supply the absolute time with high precision and over a wide area, such as the GPS system.

According to one aspect of the invention, there is provided a wireless communication method having the steps of:

receiving signals from wireless terminals via antennas that have each a plurality of antenna elements from which the received signals and the transmitted signals to which can be respectively synthesized to form an antenna directivity of a desired beam pattern;

synthesizing the signals received via said respective antenna elements of each base station to form the antenna directivity having the desired beam pattern;

selecting one of the received signals from the wireless terminals on the basis of the synthesized received signals of different directivities, and determining transmission beam direction information for use in directing the beam in the selected direction;

generating weighting coefficients for use in setting the beam patterns and transmission beam directions according to the transmission beam direction information, and producing transmission time slots according to a table showing the relations of the transmission beam directions and the time slots for the radiation of beams in those directions; and transmitting the down-link signal by using the generated beam patterns, beam directions and transmission time slots to control the antenna.

Other objects, features and advantages of the present invention will become apparent from the following description of the embodiments of the invention taken in conjunction with the accompanying drawings.

BRIEF DESCRIPTION OF THE DRAWINGS

FIG. 28 is a diagram showing a table of beam time slots used in the embodiments of the invention.

FIG. 29 is a diagram showing a modification of the table of FIG. 28.

DETAILED DESCRIPTION OF THE EMBODIMENTS

Figure 1:
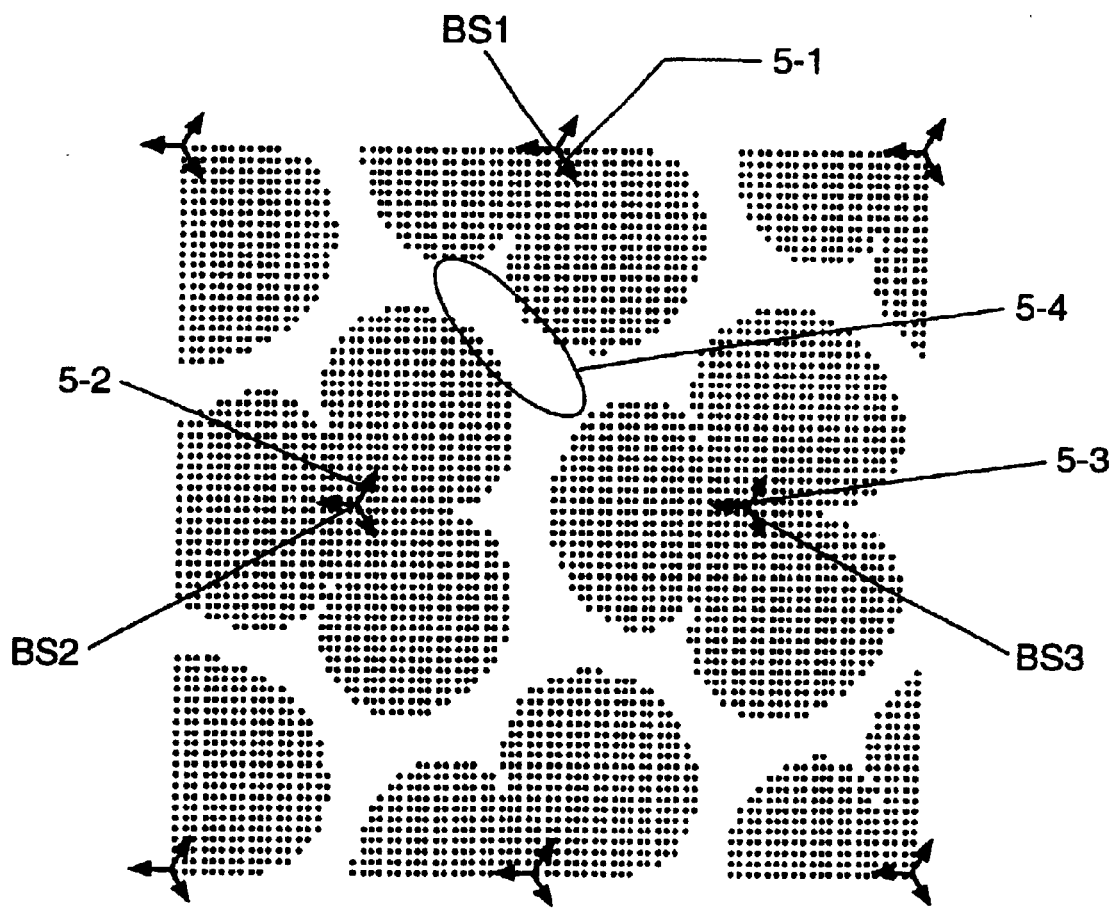
FIG. 1 is an illustration of a service coverage (614.4 kbits/s) of the HDR down-link with the base stations arranged in a triangle cell shape according to the invention.
Figure 30:
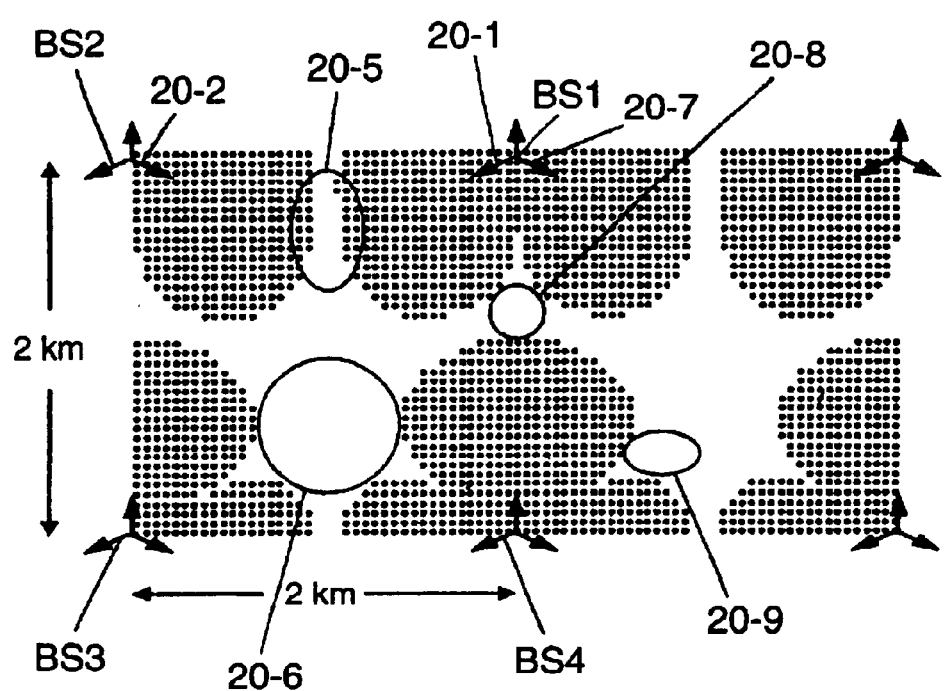
FIG. 30 is an illustration of a conventional service coverage (614.4 kbits/s) of the down-link of HDR system with the base stations arbitrarily arranged in a square cell shape.

FIG. 1 is an illustration of a service coverage (614.4 kbits/s) of the HDR down-link with the base stations disposed at the vertices of each triangle according to the invention. This illustration shows the most appropriate three-sector base stations and sector directions. Each base station in FIG. 1 is a three-sector antenna type HDR base station having an antenna of three 90-degree sectors. This coverage is obtained when data is transmitted at a rate of 614.4 kbits/s by use of all time slots. As illustrated, a boundary region between the base stations in each cell area, for example, 5-4 is difficult to be used for the transmission at this bit rate. In this region, the radio waves from the sector antenna 5-1 of BS1, the sector antenna 5-2 of BS2 and the sector antenna 5-3 of BS3 interfere with each other in space, making it difficult to transmit at a rate of 614.4 kbits/s. However, as compared with the prior art shown in FIG. 30, the area of the service-disabled region can be greatly reduced. In the conventional method of FIG. 30 the base stations are arranged in such a square cell shape as to be disposed at the vertices of each of square cells provided in a desired area, while in this embodiment of FIG. 1 the base stations are arranged in a triangle cell shape to be disposed at the vertices of each of triangle cells and the sectors of each base station are directed identically so that the radio wave interference becomes the minimum. Therefore, it is possible to avoid the increase of interference like the interference shown in FIG. 30 where the sector beam 20-1 of BS1 and the sector beam 20-2 of BS2 interfere with each other when they are irradiated on the same area at a short distance.

Figure 2:
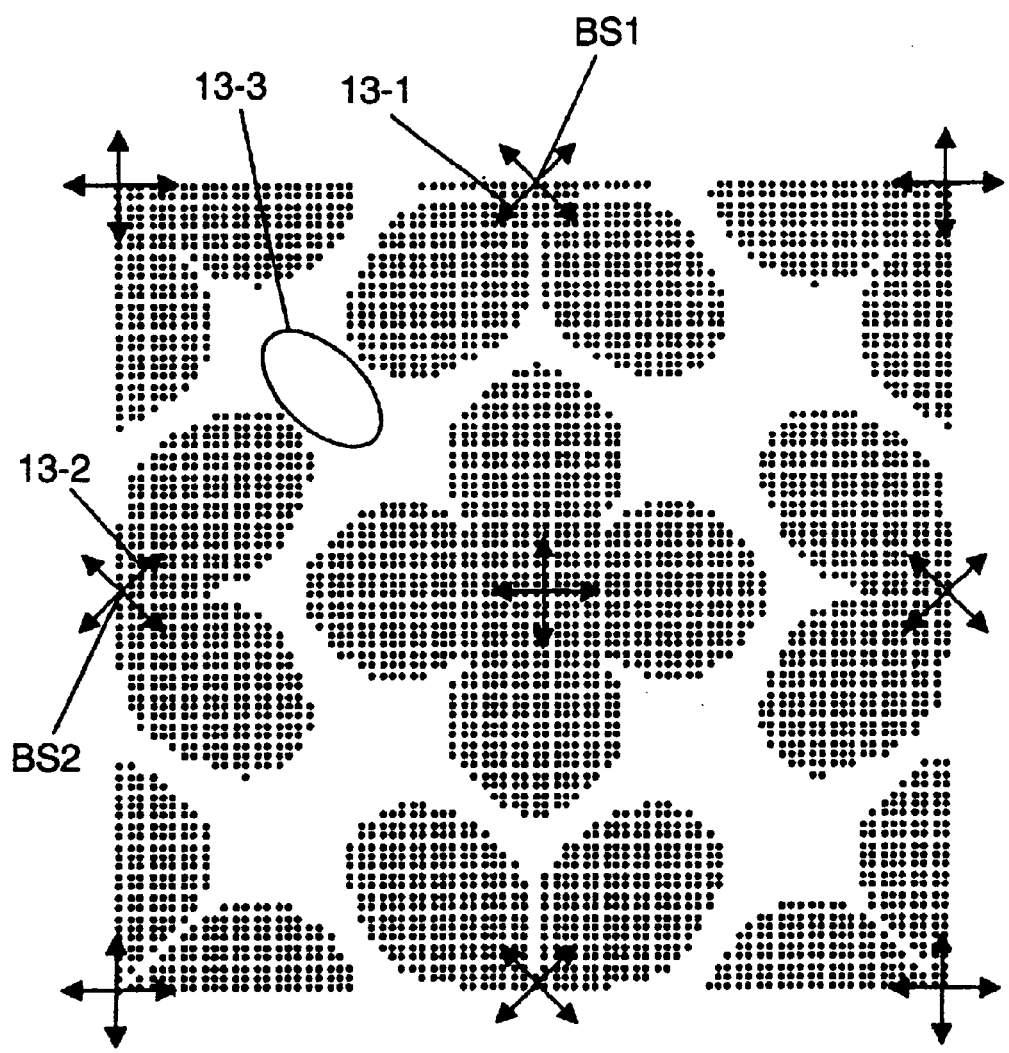
FIG. 2 is an illustration of a service coverage (614.4 kbits/s) of the HDR down-link with the base stations arranged in a square cell shape according to the invention.
Figure 31:
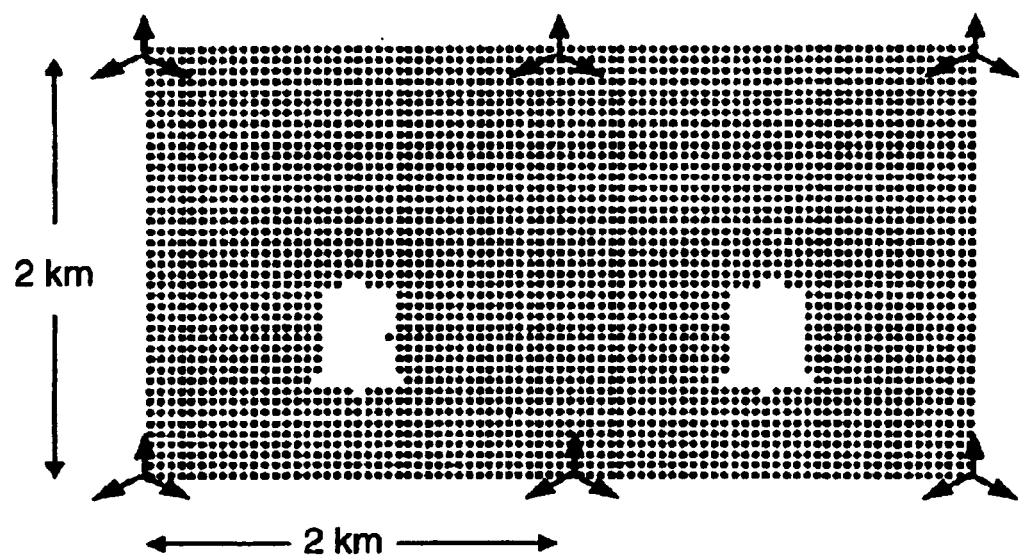
FIG. 31 is an illustration of a conventional service coverage (204.8 kbits/s) of the down-link of HDR system with the base stations arbitrarily arranged in a square cell shape.

FIG. 2 shows a service coverage (614.4 kbits/s) of the HDR down-link with the base stations arranged in a square cell shape according to the invention. This coverage can be obtained when the base stations each have four sector antennas of 90-degree half-power angle and transmit data at a bit rate of 614.4 kbits/s by use of all time slots. When the three-sector type base stations are arranged in a square cell shape, the beams from the base stations cannot be avoided from geometrically interfering with each other as shown in the conventional examples of FIGS. 30 and 31. When the base stations are arranged in a square cell shape, it is necessary that each base station have four sector beams as shown in FIG. 2. If the sectors of the adjacent base stations are shifted 45 degrees to each other as illustrated in FIG. 2, the beam interference can be minimized.

Although the above descriptions are about the effects of the first embodiment of the invention, the service-disabled region still remains at a mid distance between the base stations such as, for example, at region 5-4 in FIG. 1, and region 13-3 in FIG. 2.

Figure 3:
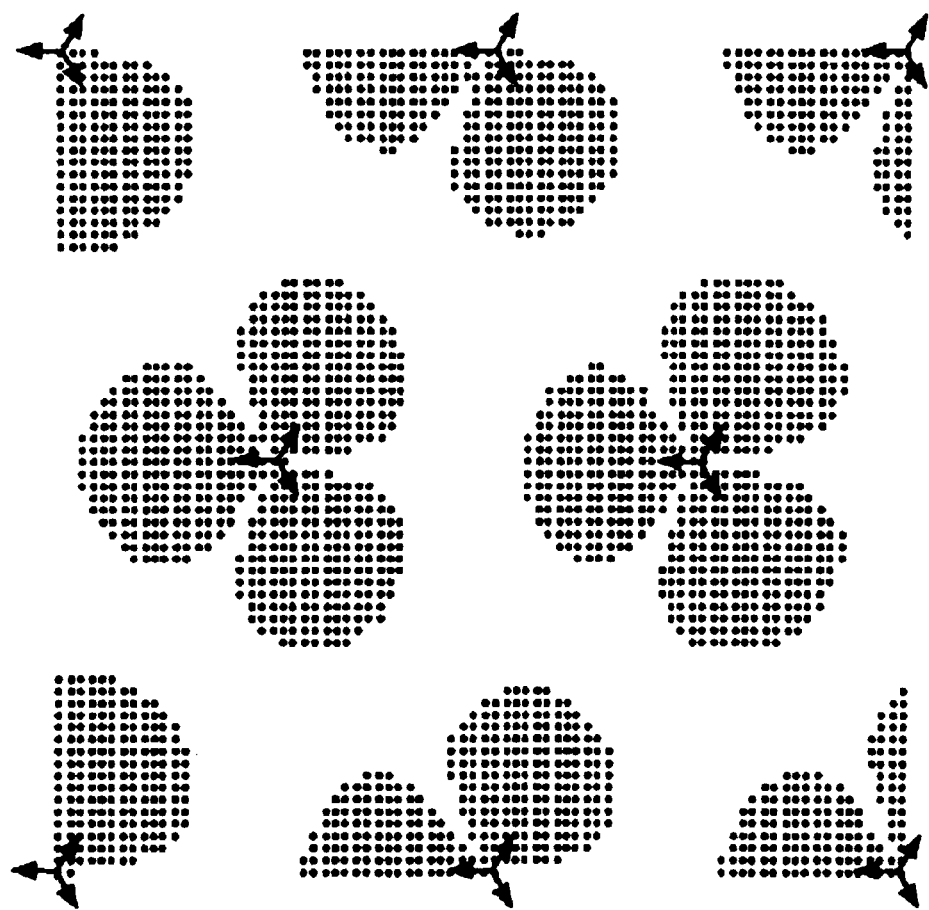
FIG. 3 is an illustration of a service coverage (1228.8 kbits/s) of the HDR down-link with the base stations arranged in a triangle shape according to the invention.

In addition, the base stations are arranged in a triangle cell shape to provide a service coverage (1228.8 kbits/s) of HDR down-link according to the invention as shown in FIG. 3. The base stations each have three sector antennas of 90-degree half-power angle and transmit data at a bit rate of 1228.8 kbits/s by use of all time slots. If the bit rate is increased to 1228.8 kbits/s, the service area is greatly reduced as illustrated. The service-disabled region is generated in the boundary regions between the cells of the adjacent base stations and in the boundary regions between the sectors within each base station. In other words, the first embodiment in which only the sector number and sector direction are optimized still has a difficulty in removing the service-disabled region.

Figure 25:
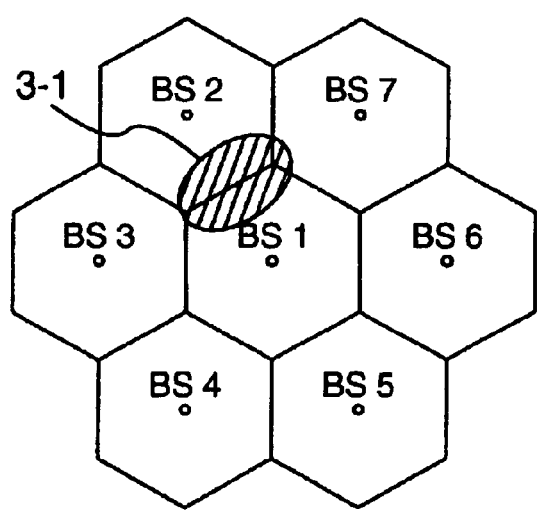
FIG. 25 is an illustration of an example of the general arrangement of base stations.
Figure 26:
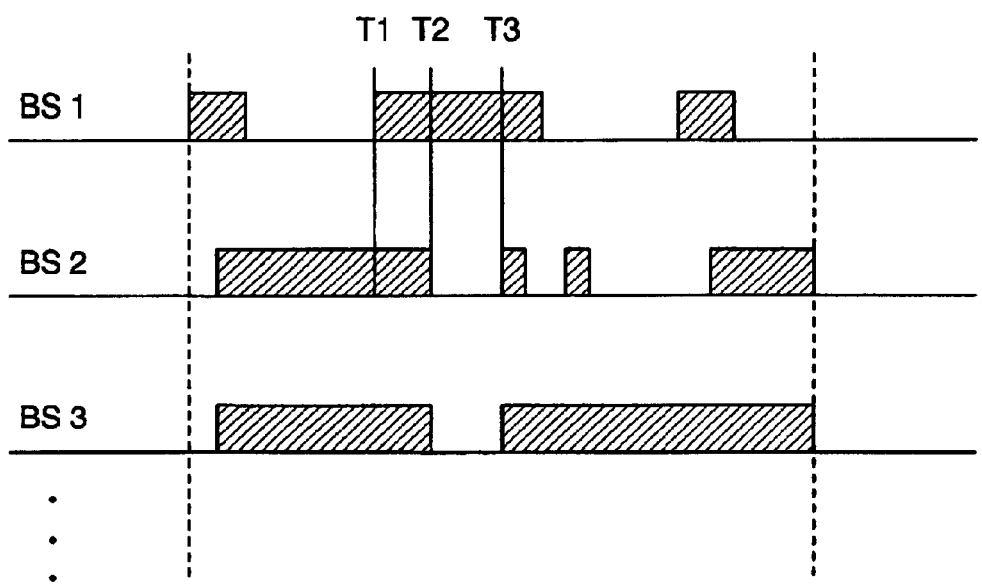
FIG. 26 is a timing diagram of the transmission signals on the down-link of HDR system.

Thus, the service area is further expanded by making use of the fact that the down-link of HDR system employs a time-division multiplexing system. Since the BS2 stops radio wave radiation in the interval from time T2 to T3 as illustrated in FIG. 26, the signal from BS1 can have a high value of C/I ratio even in the hatched area 3-1 in FIG. 25, and consequently can be transmitted at a high bit rate. In other words, if the radio waves from the base stations are simultaneously not radiated toward the regions between the adjacent cells or sectors where they interfere with each other, the amount of interference between the radio waves can be remarkably reduced, and hence it is possible to expand the area in which signals can be transmitted at a high bit rate.

The second embodiment of the invention is characterized chiefly by the fact that a function to switch the different transmission directivities that the antenna can have is provided in each base station within the system, and that the directivity switching operations of the base stations are synchronized with each other, so that the probability at which the signals transmitted from a plurality of base stations interfere each other at the same time can be minimized at a particular terminal. As a result, each terminal can communicate under the condition that the interference noise from the adjacent or other base stations is extremely small in the time slot set in itself, and at the maximum bit rate by the best effort function.

Figure 4:
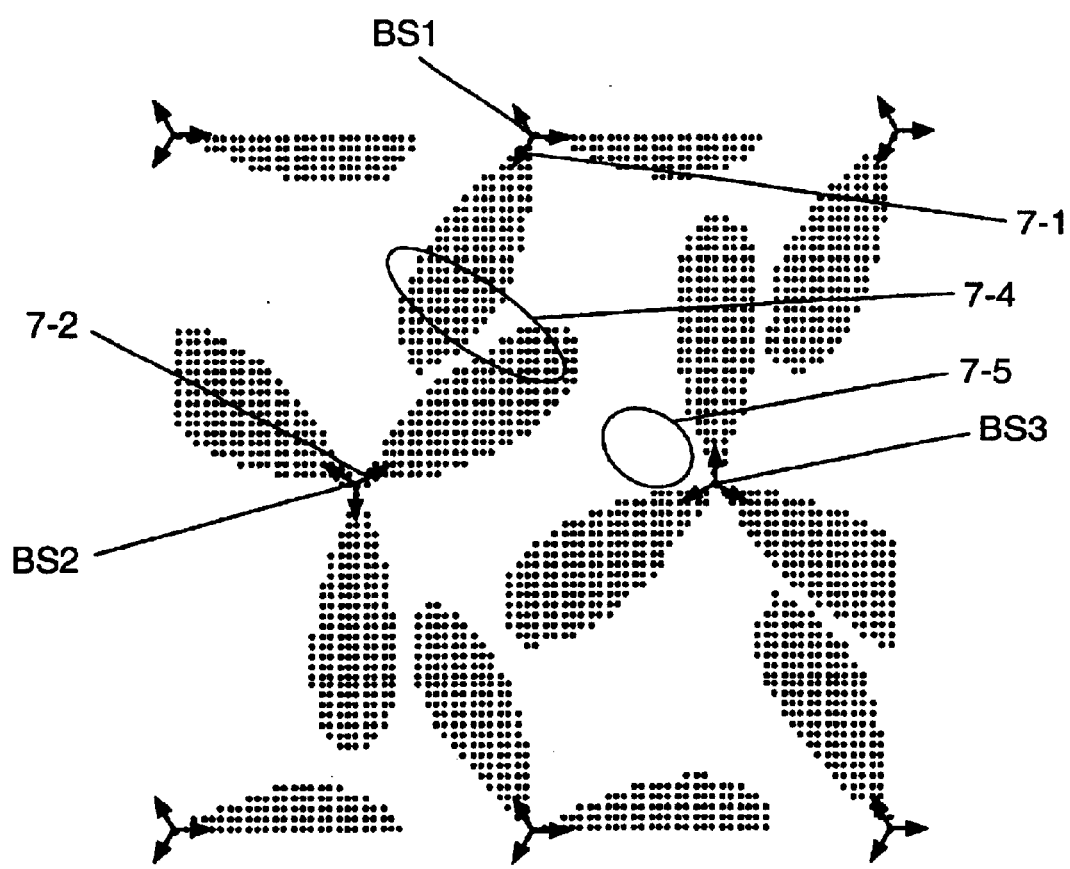
FIG. 4 is an illustration of a service coverage of the HDR down-link using 30-degree sector antennas and time slot A according to the invention.

FIG. 4 is a diagram showing the service coverage of the HDR down-link using 30-degree sector antennas and time slot A (FIG. 24) according to the invention. As illustrated, signals from three ones of 12 sector antennas of 30-degree half-power angle are transmitted at a bit rate of 614.4 kbits/s on time slot A. In this embodiment, unlike the cases of FIGS. 1 and 3, the sector antenna half-power angle is selected to be as narrow as 30 degrees. As illustrated, the radiation coverage of each base station is extended to the intermediate distance between the adjacent base stations as at the boundary region 7-4 between BS1 and BS2. When the sector beams are made narrow, the signals radiated from, for example, the sector antennas directing to 7-1 and 7-2 are passed skimming each other, or close to each other but not intersect each other so that the interference is difficult to occur. However, since the beams are narrow under this condition the intermediate region as, for example, at region 7-5 between the beams cannot be covered so that the communication enabled coverage is limited to a small area.

Figure 24:
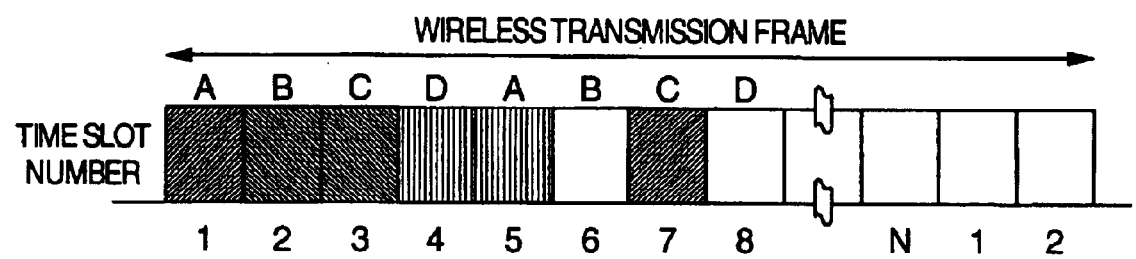
FIG. 24 is an illustration of the multiplexing of the down-link of HDR system.

The communication channels on the down-link of HDR system are multiplexed in a time sharing manner as shown in FIG. 24. Thus, if each base station having, for example, three sector antennas of 30-degree half-power angle radiates radio waves from the sector antennas four times with the antenna radiation directions each time rotated 30 degrees at a time of time slots change, the radiation of radio waves becomes equivalent to the rotation of beams to scan the periphery around the base station, thus covering all the directions. The condition, for example, shown in FIG. 4 is assumed to be the coverage of time slot A shown in FIG. 24. Then, the service coverages of the HDR down-link using the 30-degree sector antennas and time slots B, C and D according to the invention are respectively shown in FIGS.

5, 6 and 7. Here, three ones of 12 directive antennas of 30-degree half-power angle are used, and signals are transmitted at a bit rate of 614.4 kbits/s as in FIG. 4. As illustrated, the directions in which the radio waves are radiated on all time slots from the respective base stations are controlled to change in synchronism with each other. This corresponds just to the fact that each three sectors of 12 directive antennas of 30-degree half-power angle is used for each time slot.

Figure 5:
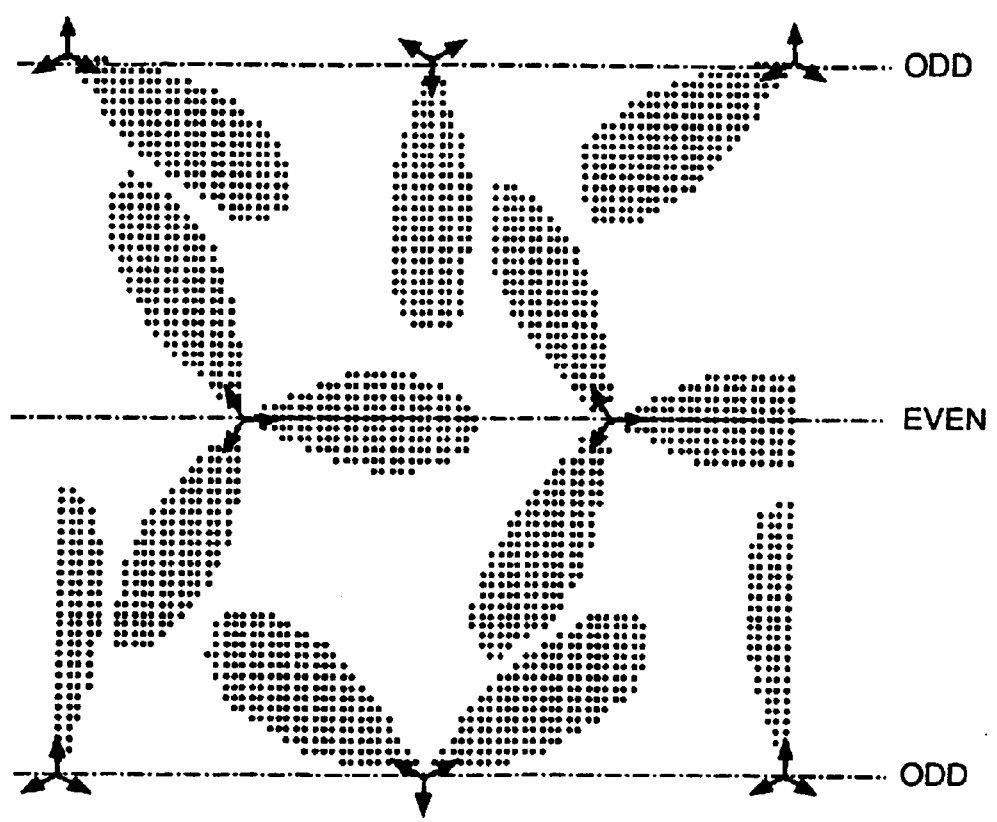
FIG. 5 is an illustration of a service coverage of the down-link of the HDR using 30-degree sector antennas and time slot B according to the invention.
Figure 6:
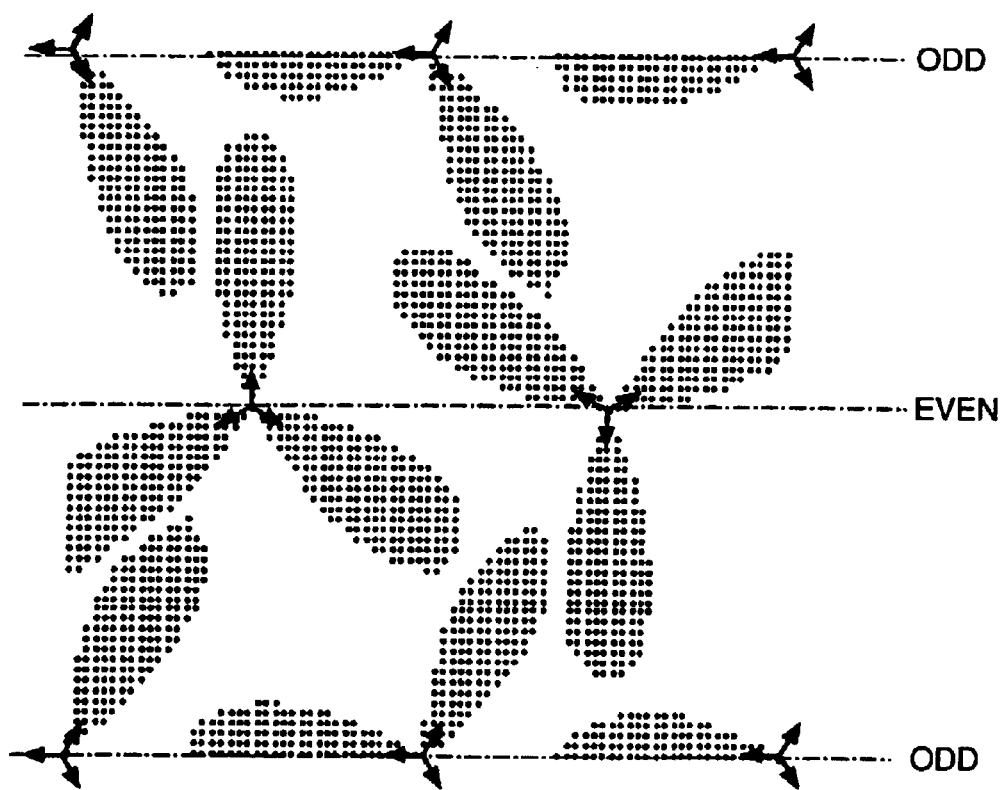
FIG. 6 is an illustration of a service coverage of the HDR down-link using 30-degree sector antennas and time slot C according to the invention.
Figure 7:
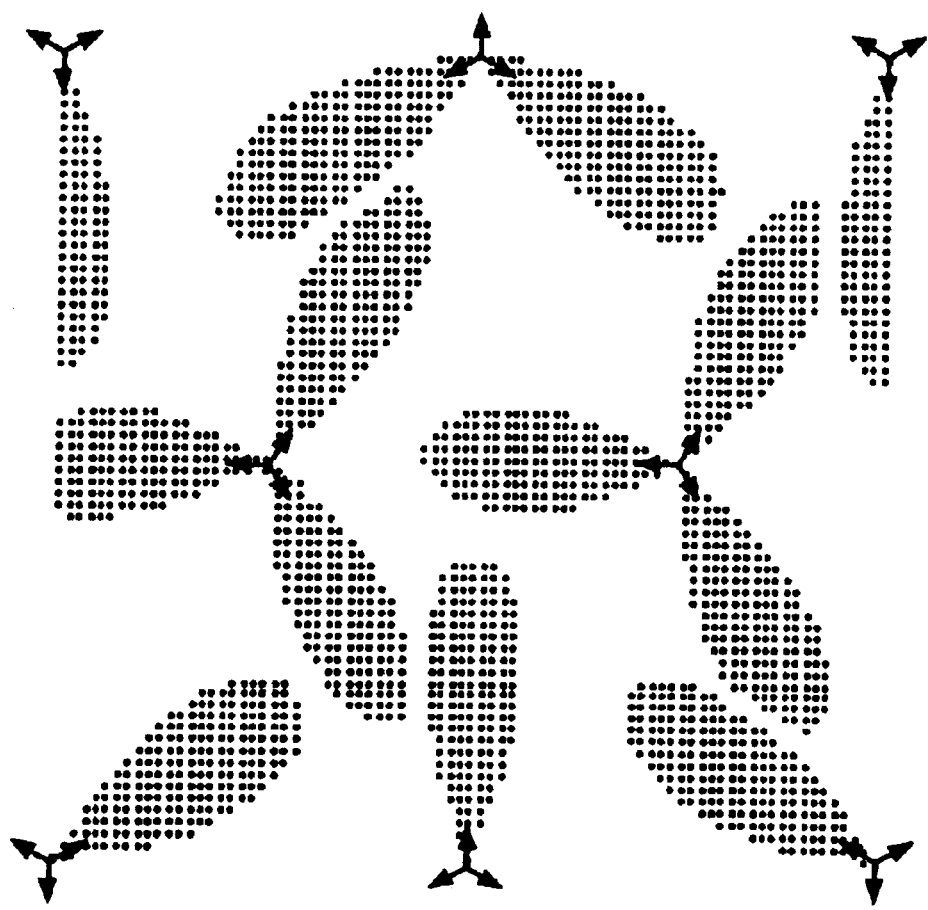
FIG. 7 is an illustration of a service coverage of the HDR down-link using 30-degree sector antennas and time slot D according to the invention.

The optimum directions in which the radio waves are radiated on the time slots are respectively as shown in FIGS. 4 through 7. Referring to FIG. 5 for the time slot B, the base stations are classed as odd rows and even rows, the laterally and longitudinally adjacent base stations in the odd rows have their antenna radiations directed 180 degree upside-down as illustrated, and all the base stations in the even rows have their antenna radiations directed in the same directions as illustrated. In the time slot C of FIG. 6, all the base stations in the odd rows have their antenna radiations directed in the same directions, and the laterally and longitudinally adjacent base stations in the even rows have their antenna radiations directed differently with respect to the drawing sheet.

Figure 8:
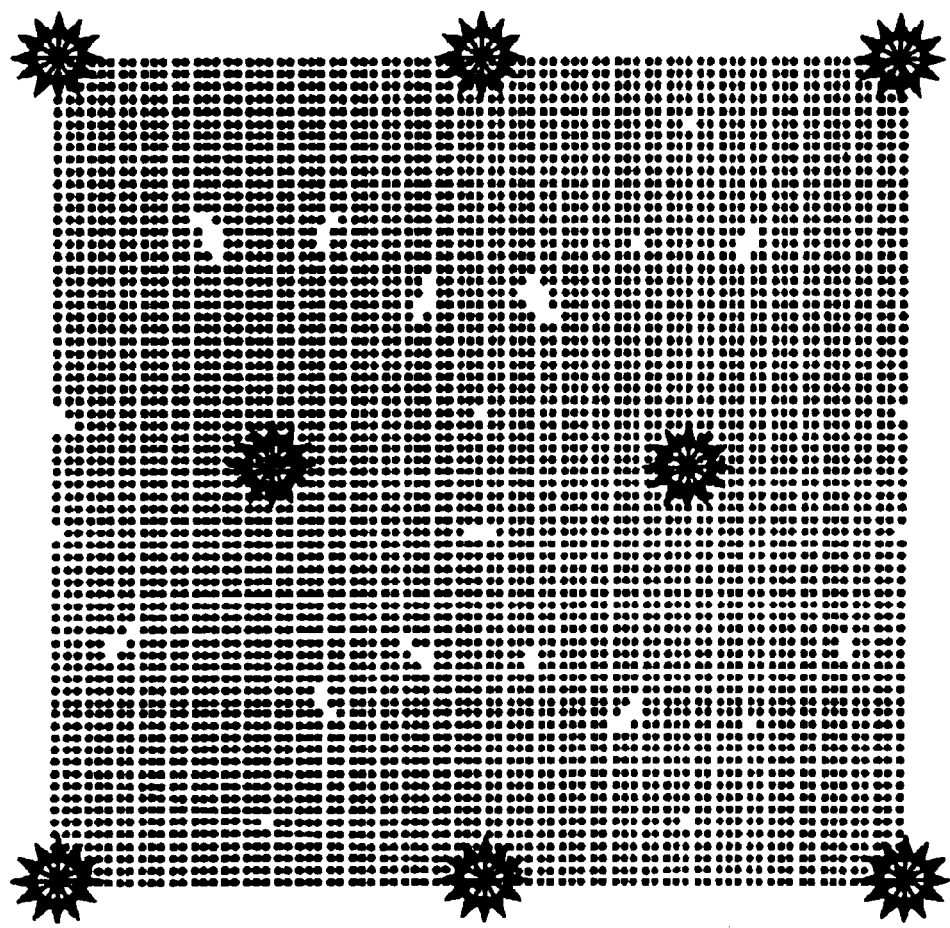
FIG. 8 is an illustration of a total service coverage (614.4 kbits/s) of the HDR down-link using 30-degree sector antennas and time slots A, B, C and D according to the invention.

FIG. 8 is a diagram showing the total service coverage (614.4 kbits/sec) of the HDR down-link using time slots A, B, C, D and antennas of 30-degree half-power angle according to the invention. This illustration shows the result of adding the coverages scanned by the four time slots A, B, C, D of radio waves from the three sectors of the base stations each at a bit rate of 614.4 kbits/s. From FIG. 8, it will be understood that, as compared with the case in which the 90-degree fixed type three-sector antennas are used as in FIG. 1, this embodiment enables the terminals in almost all areas to communicate at a rate of 614.4 kbits/s.

Figure 9:
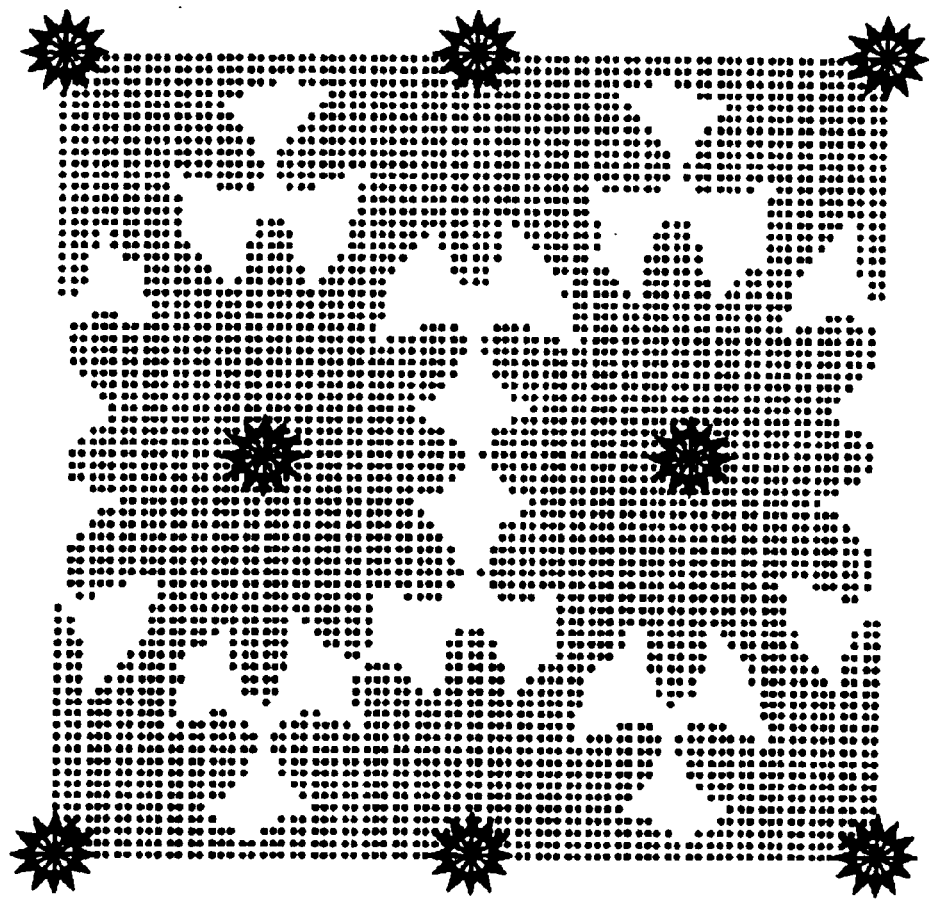
FIG. 9 is an illustration of a total service coverage (1228.8 kbits/s) of the HDR down-link using 30-degree sector antennas and time slots A, B, C and D according to the invention.
Figure 10:
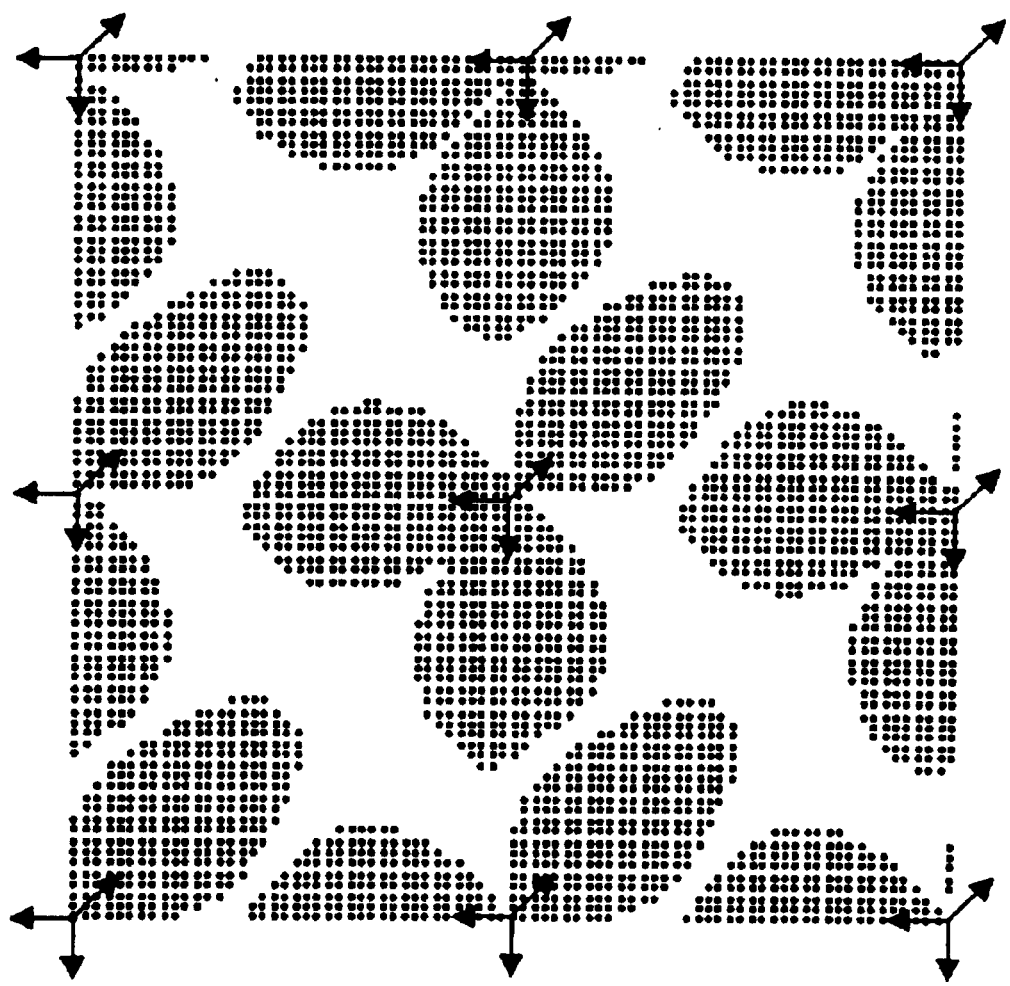
FIG. 10 is an illustration of a service coverage of the HDR down-link using 90-degree sector antennas and time slot A according to the invention.
Figure 11:
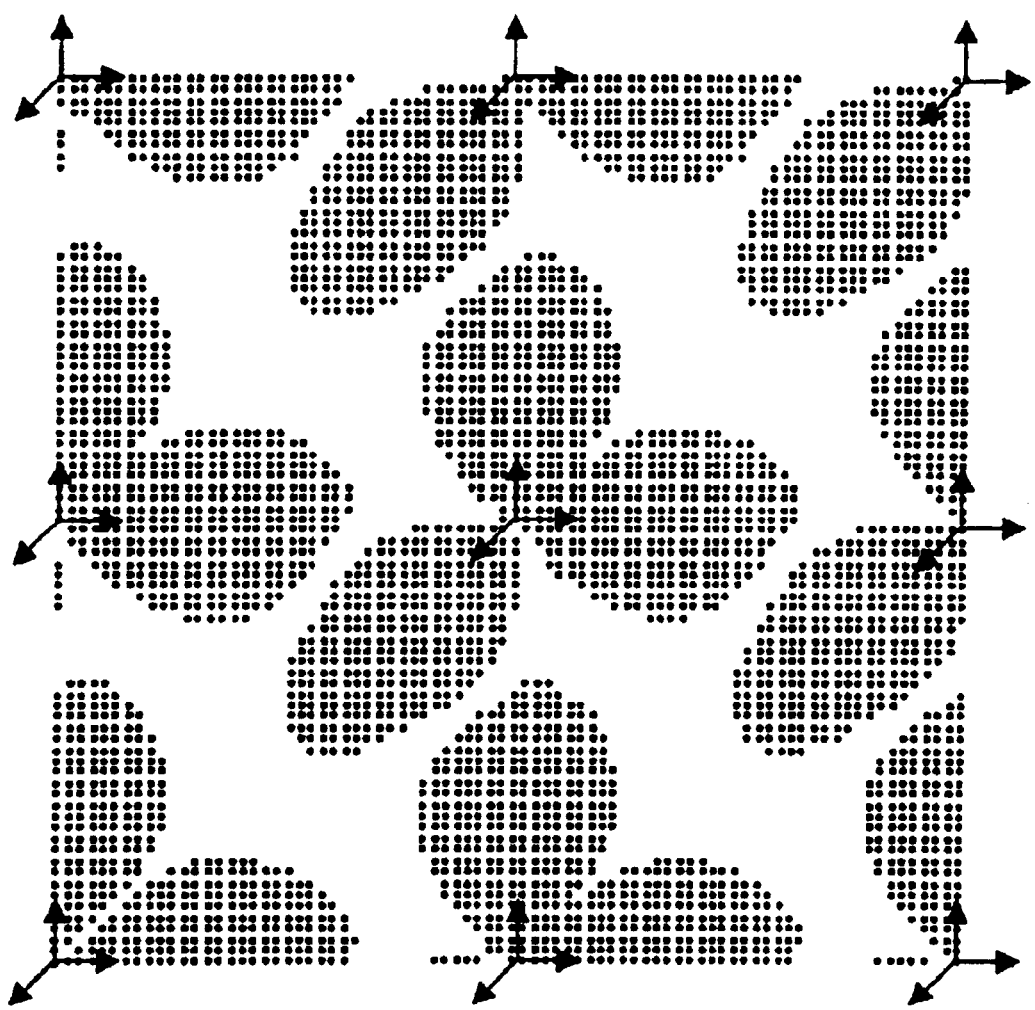
FIG. 11 is an illustration of a service coverage of the HDR down-link using 90-degree sector antennas and time slot B according to the invention.
Figure 12:
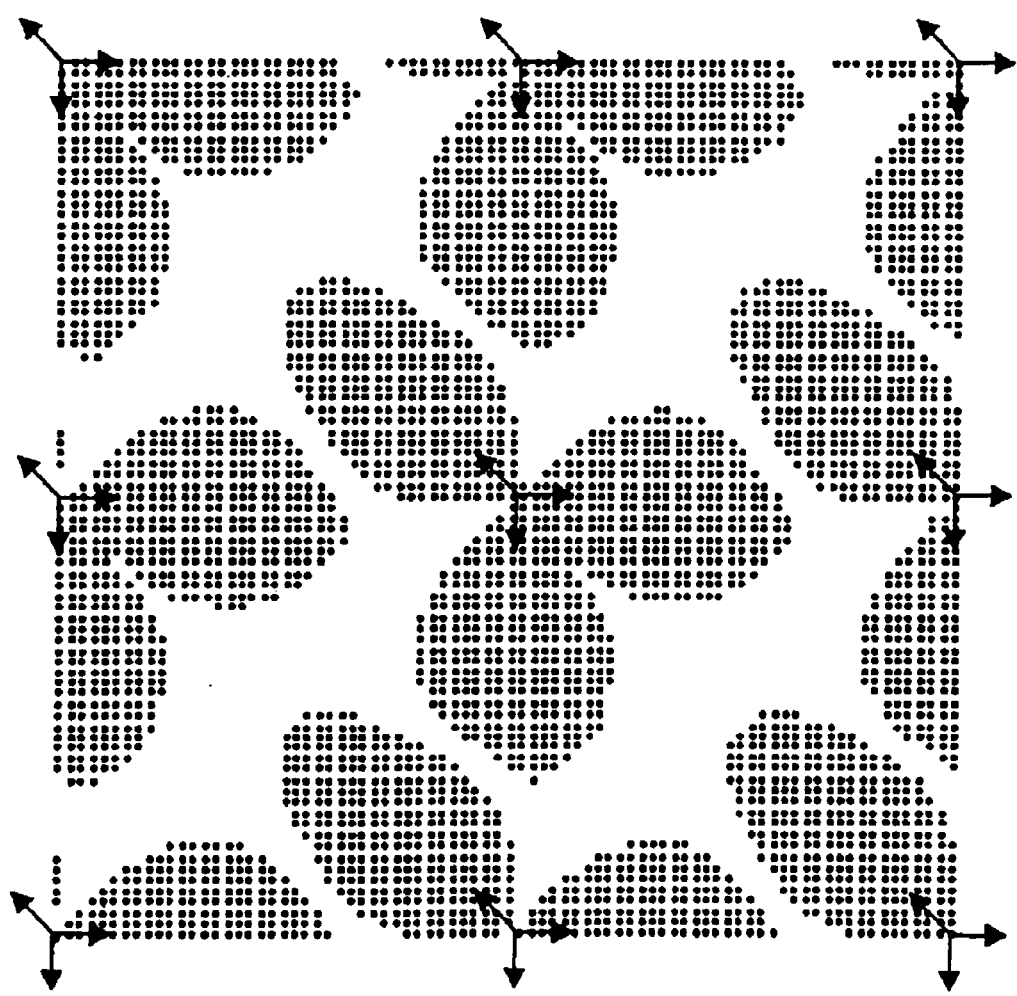
FIG. 12 is an illustration of a service coverage of the HDR down-link using 90-degree sector antennas and time slot C according to the invention.
Figure 13:
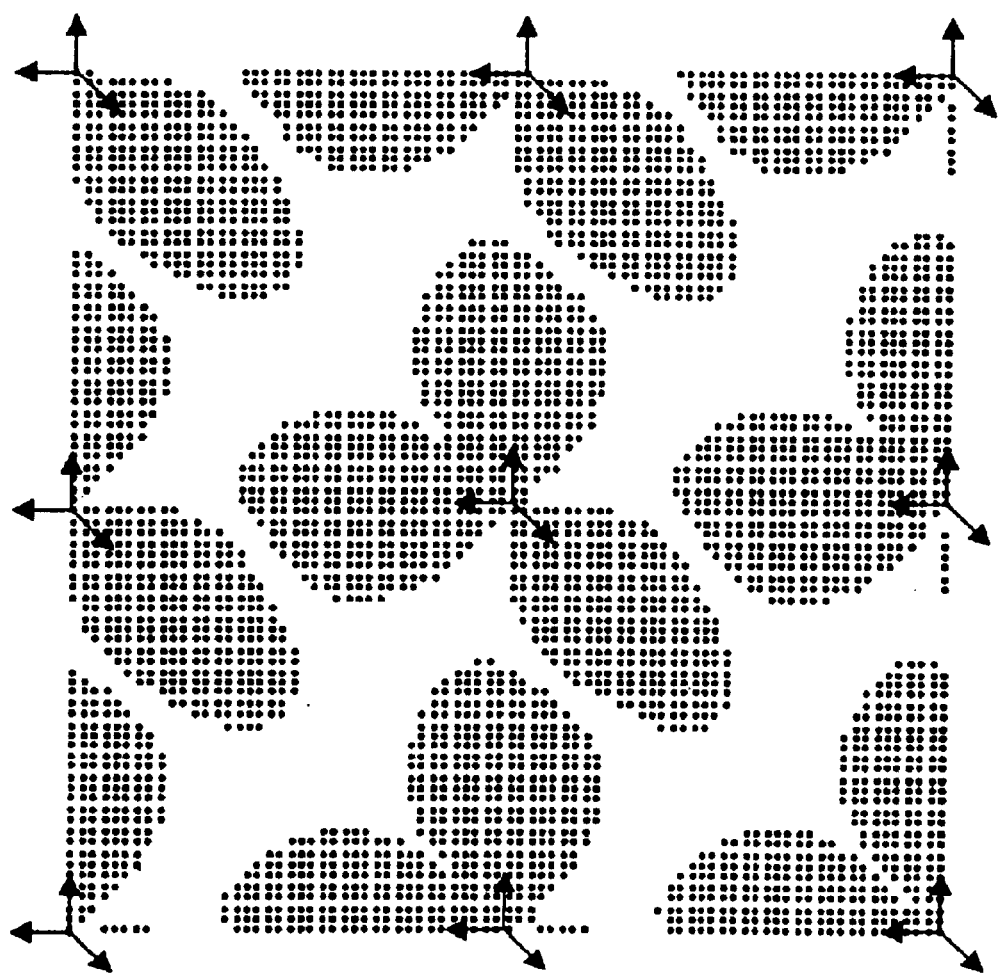
FIG. 13 is an illustration of a service coverage of the HDR down-link using 90-degree sector antennas and time slot D according to the invention.

FIG. 9 is a diagram showing the total service coverage (1228.8 kbits/s) of the HDR down-link of the base stations each having the antennas of 30-degree half-power angle and time slots A, B, C, D according to the invention. This illustration shows the coverage of 1228.8 kbits/s calculated in the same way. From FIG. 9, it will be understood that, as compared with the result of FIG. 3 calculated for the same bit rate, this embodiment can expand the coverage.

The application of this second embodiment to the square-arranged base stations will be described. FIGS. 10 through 13 show the service coverages of HDR down-link of base stations each using antennas of 90-degree half-power angle and time slots A, B, C, D according to the invention. These service coverages are obtained by using three sectors of 8 directive antennas of 90-degree half-power-angle in each base station that radiates radio waves at a bit rate of 614.4 kbits/s. As described above with reference to FIG. 2, each of the base stations that are disposed at the vertices of each square as in FIG. 2 is most preferably formed by four sectors. Even if the sectors are rotated in any way with the sector directions of each base station kept unchanged as in FIG. 2, the region 13-3 at the mid point of BS1 and BS2, for instance, cannot be covered as a service area, because the beam 13-1 of BS1 and beam 13-2 of BS2 interfere with each other along their diagonal line. The interference on the diagonal line cannot be avoided even by rotating the four-sector antennas anyhow.

In the embodiment shown in FIGS. 10 through 13, in order to solve this problem, each base station has a 90-degree beam antenna provided that is formed of 8 different directions. However, only three beams of those directions can be used for each time slot as illustrated. As an example, two beams of the three beams are directed perpendicularly to each other, and the other beam is directed at an angle of 135 degrees relative to these beams.

Figure 14:
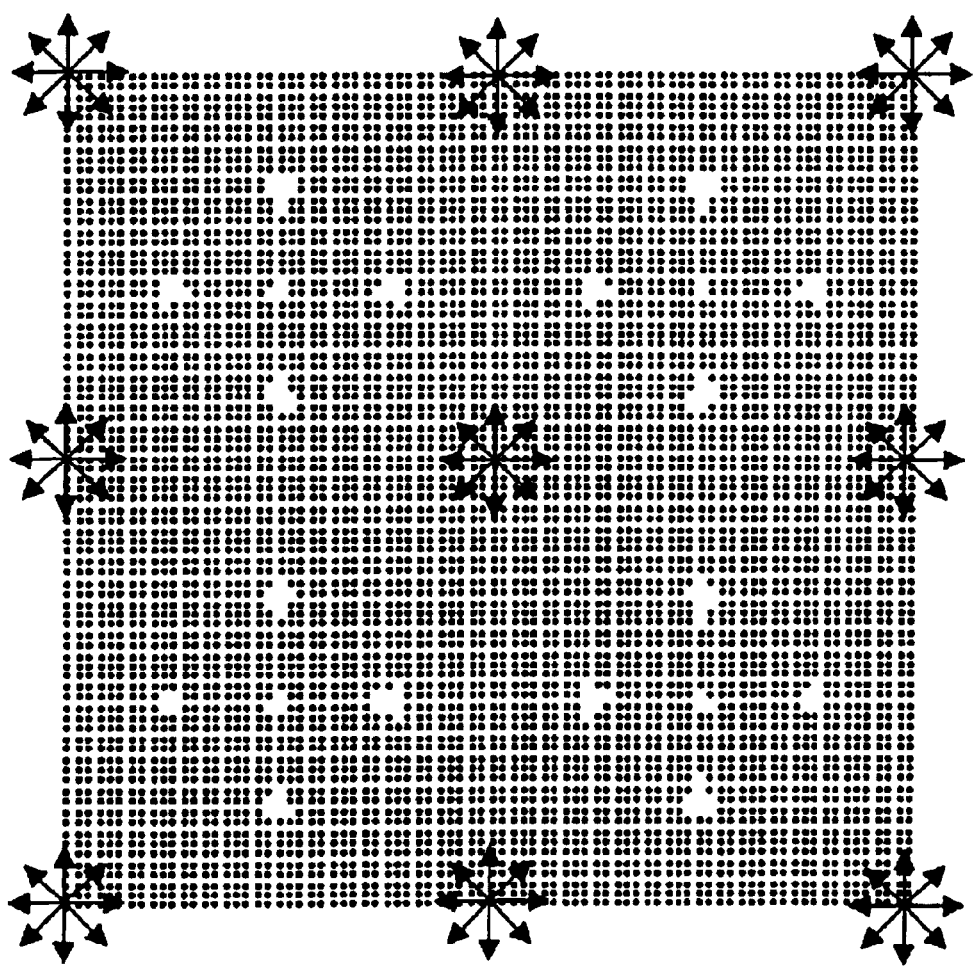
FIG. 14 is an illustration of a total service coverage (614.4 kbits/s) of the HDR down-link using 90-degree sector antennas and time slots A, B, C and D according to the invention.

FIG. 14 is a diagram showing the total service coverage (614.4 kbits/s) of HDR down-link using sector antennas of 90-degree half-power angle and time slots A, B, C, D according to the invention. This total service coverage is the result of the addition of all beams on those time slots, and it includes almost all regions as a service area at a bit rate of 614.4 kbits/s as illustrated.

The beam directions of the square-arranged base stations are different from those of the triangularly arranged base stations shown in FIGS. 4 through 7. The most suitable service coverage can be obtained when the beam directions of each base station are not changed for all time slots. In this case, it is necessary that two beams of the three beams radiated on each time slot be perpendicular to each other and that the other remaining beam be radiated at an angle of 135 degrees relative to the those two beams. Thus, only one of the four base stations of each square radiates its radio wave beam along the diagonal line on each time slot, so that the interference along the diagonal line can be prevented from occurring.

The specific constructions for the invention will be described.

Figure 15:
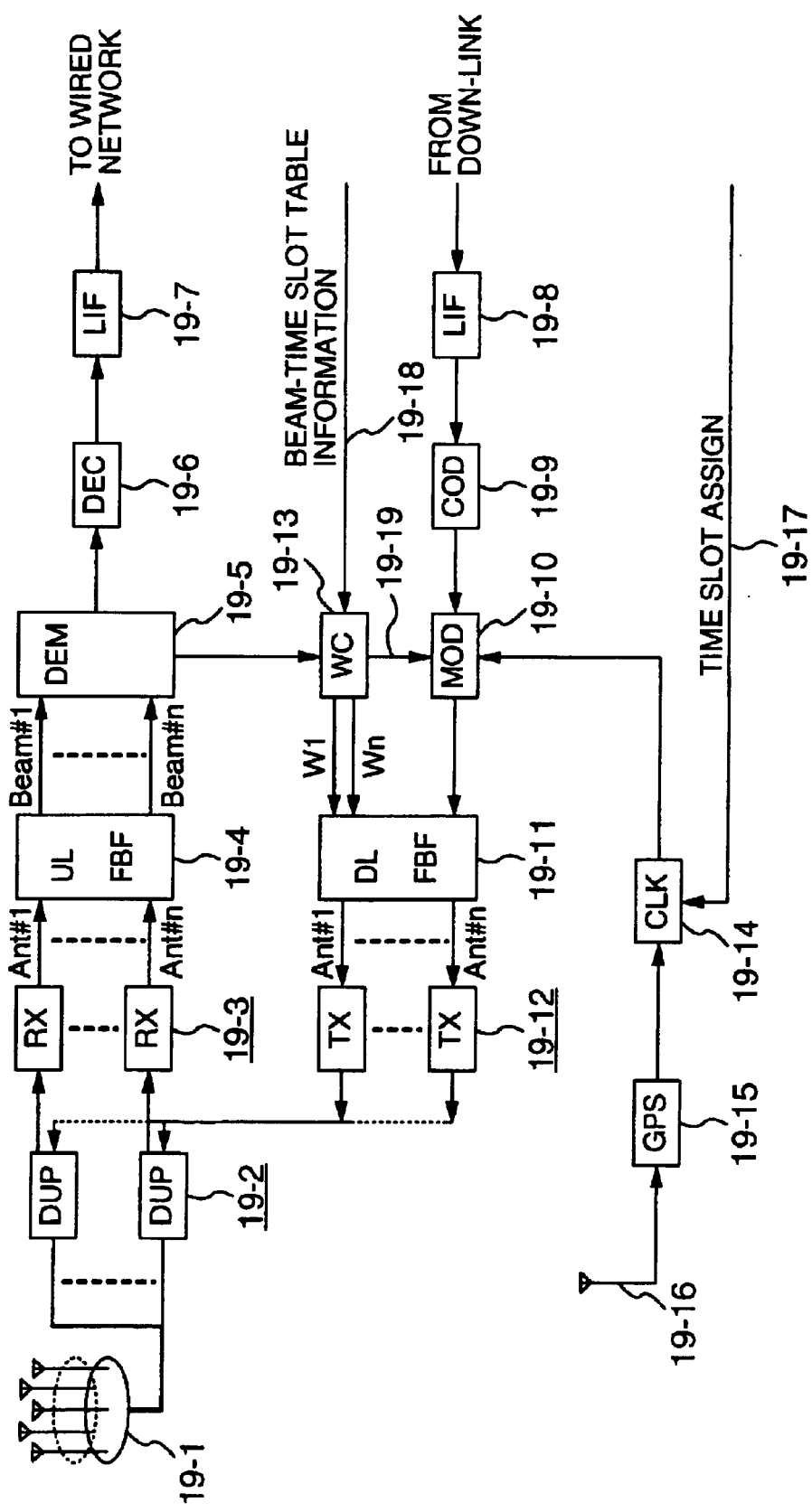
FIG. 15 is a circuit block diagram showing the construction of the base station according to the first embodiment of the invention.

FIG. 15 is a block diagram showing the construction of the first embodiment of the base station according to the invention. This base station includes an antenna module 19-1, duplexers (DUP) 19-2, receiver radio-frequency circuits (RX) 19-3, an up-link fixed beam-forming circuit (UL FBF) 19-4, a demodulator (DEM) 19-5, a decoder 19-6, an access line interface (LIF) 19-7, another access line interface (LIF) 19-8, a coder (COD) 19-9, a modulator (MOD) 19-10, a down-link fixed beam-forming circuit (DL FBF) 19-11, transmitter radio-frequency circuits (TX) 19-12, a weighting circuit (WC) 19-13, a clock generation circuit (CLK) 19-14, and a GPS (global positioning system) 19-15.

First, the up-link will be described. The antenna module 19-1 is formed by an antenna array that can form a sharp-directivity beam pattern of, for example, 8 beams or 12 beams. Each of the duplexers (DUP) 19-2 separates the transmitted and received signals, and is formed by a band-pass filter for selecting each signal in the general mobile communications system. The receiver radio-frequency circuits (RX) 19-3 amplify the signals from the antenna elements that constitute the antenna array, and convert their frequencies to other frequencies in order to obtain a certain sensitivity. The output signals from the RXs 19-3 are supplied to the up-link fixed beam-forming circuit (UL FBF) 19-4. The UL FBF 19-4 makes vector addition of the signals fed from the antenna elements, thereby achieving the antenna directivity having a radiation pattern (beam pattern) of, for example, 8 beams or 12 beams around the antenna array.

Figure 16:
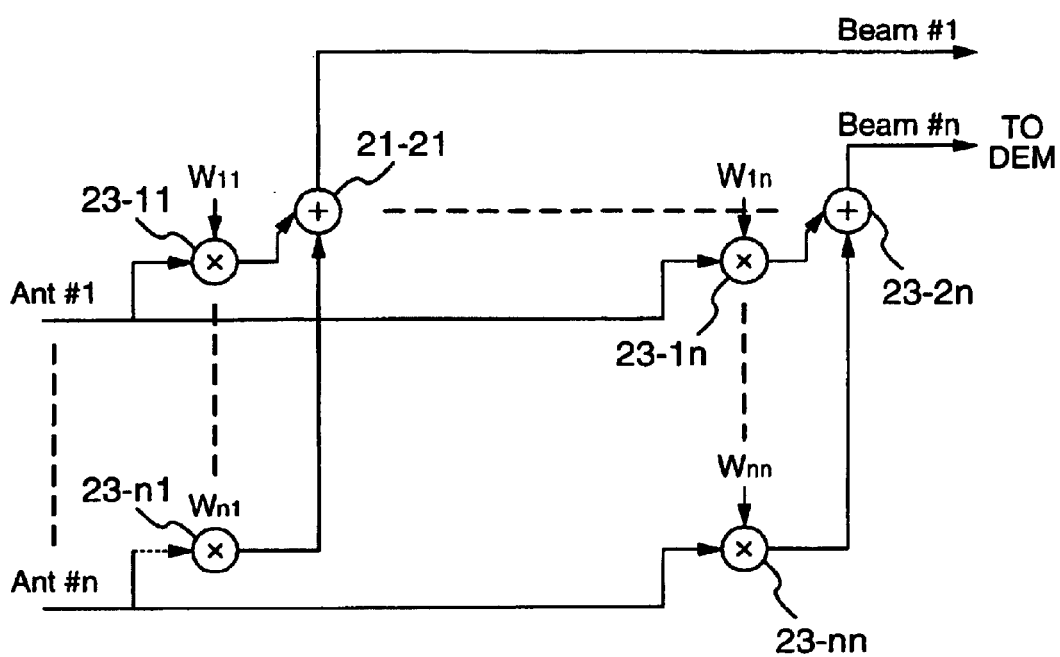
FIG. 16 is a circuit block diagram showing the detailed construction of UL FBF 19-4.

FIG. 16 shows the detailed construction of UL FBF 19-4. In FIG. 16, Ant#1~Ant#n represent the amplified output signals that the RXs 19-3 shown in FIG. 15 have produced in response to the signals from the antenna module. These signals are properly weighted by multipliers 23-11, 23-1$n$, 23-$n$1, 23-$nn$, and synthesized by adders 23-21, 23-2$n$ into narrow half-power angle beam signals Beam#1~Beam#n. The weighting coefficients $W_{11}$–$W_{nn}$ fed to the multipliers are generally selected to be vector coefficients in order to change the amplitudes and phases at the same time. The equation shown on the lower side of FIG. 16 is a matrix equation for the signal processing in the FBF 19-4. The weighting coefficients $W_{11}$–$W_{nn}$ can be easily set by simulation or like in order to form beams having appropriate radiation angles.

Figure 17:
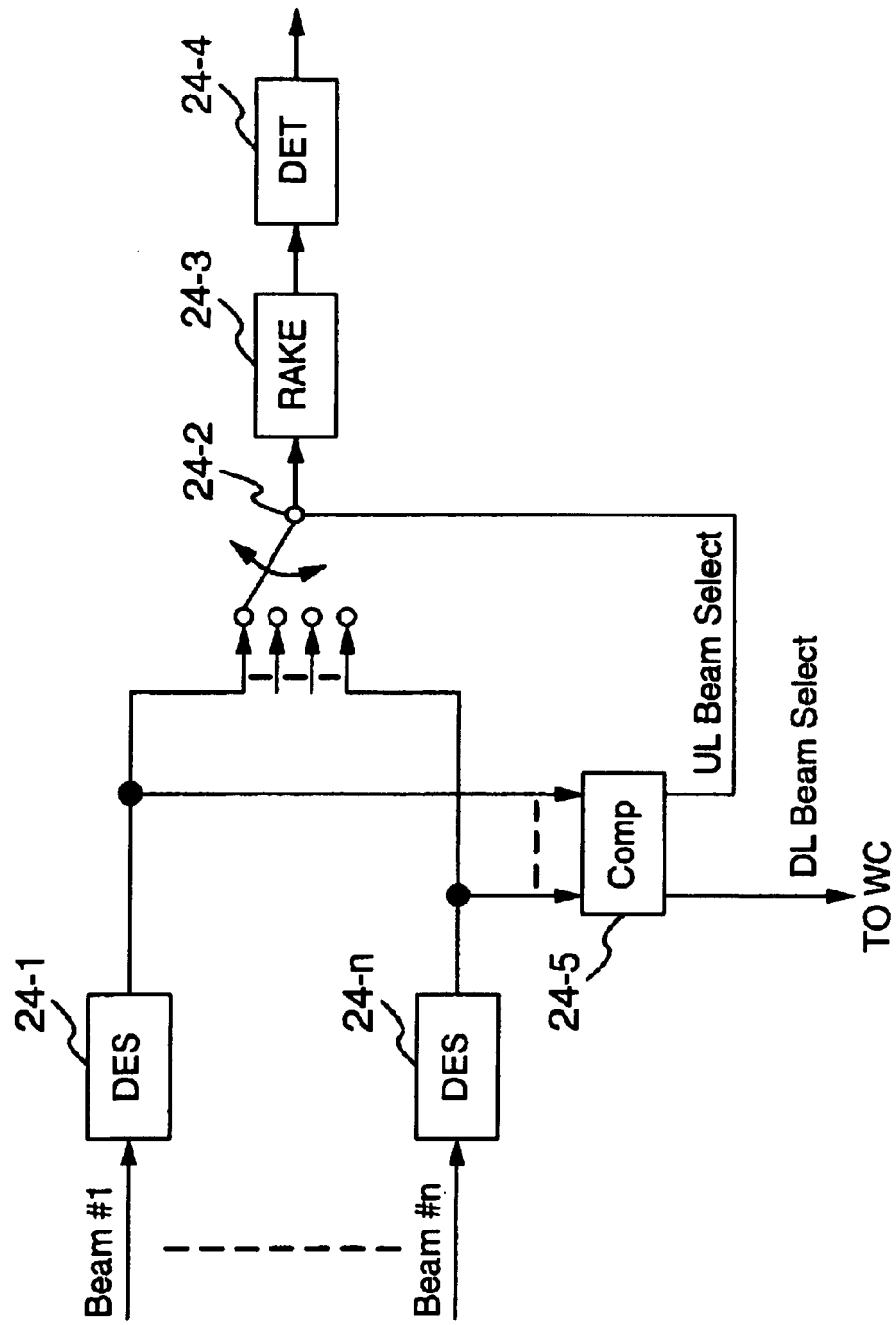
FIG. 17 is a circuit block diagram showing the detailed construction of DEM 19-5.

The received signals processed to have directivities by the UL FBF 19-4 are fed to the demodulator (DEM) 19-5. FIG. 17 shows the detailed construction of the DEM 19-5. In the DEM 19-5, the beam signals Beam#1–Beam#n from the UL FBF 19-4 are fed to channel separation circuits (DES) 24-1–24-$n$ such as despreading circuits, where the signals from desired terminals are separated, and an appropriate beam is selected by the following switch 24-2. The selected beam signal is fed to, for example, a rake receiver (RAKE) 24-3 where a multipath signal is added each other to synthesize a uniform response. The synthesized signal is demodulated by a demodulator (DET) 24-4 into a base-band digital signal. The signal to be selected by the switch 24-2 is determined by a comparator (Comp) 24-5. In order to select, for example, a signal that should be received, it is desired that the signal as one of the received signals have the maximum ratio to interference noise. Therefore, the switch 24-2 is, for example, operated to select signals in the order of larger amplitude from the multipath signals received by all the beams. The operation of this switch 24-2 is controlled by an up-link beam selection signal UL Beam Select. The beam that should be selected on the down-link is determined by the down-link beam selection signal DL Beam Select. On the down-link, it is desired to direct the beam in the direction in which the desired terminal physically exists. The direction in which the terminal exists can be known by, for example, detecting the beam direction in which the amplitude of the received signal becomes the maximum. The beam direction information selected by this detection is sent as the DL Beam Select signal to the transmitter weighting circuit WC (19-13). In addition, the signal from the DEM 19-5 is fed to the following decoder (DEC) 19-6 to correct bit error, and then fed through the access line interface (LIF) 19-7 to the wire communication networks.

On the down-link, the signal from the access line interface (LIF) 19-8 is coded for error correction by the coder (COD) 19-9, and modulated by the modulator (MOD) 19-10 according to a predetermined modulation system. This modulated signal is fed to the down-link fixed beam forming circuit (DL FBF) 19-11, where it is synthesized in vector to have a beam pattern having the directivity by which the direction of the radio wave to be radiated is determined. The output signals are fed to the transmitter radio-frequency circuits (TX) 19-12 that are connected to the antenna elements. Thus, these signals are amplified and converted in frequency by the transmitter radio-frequency circuits, and fed via the DUP 19-2 to the antenna module 19-1. The direction in which the radio wave is radiated on the down-link is determined by applying the transmission beam direction information, DL Beam Select, based on the direction in which the up-link signal is received as determined by the DEM 19-5, to the down-link fixed beam forming circuit 19-11 via the weighting circuit (WC) 19-13.

Figure 18:
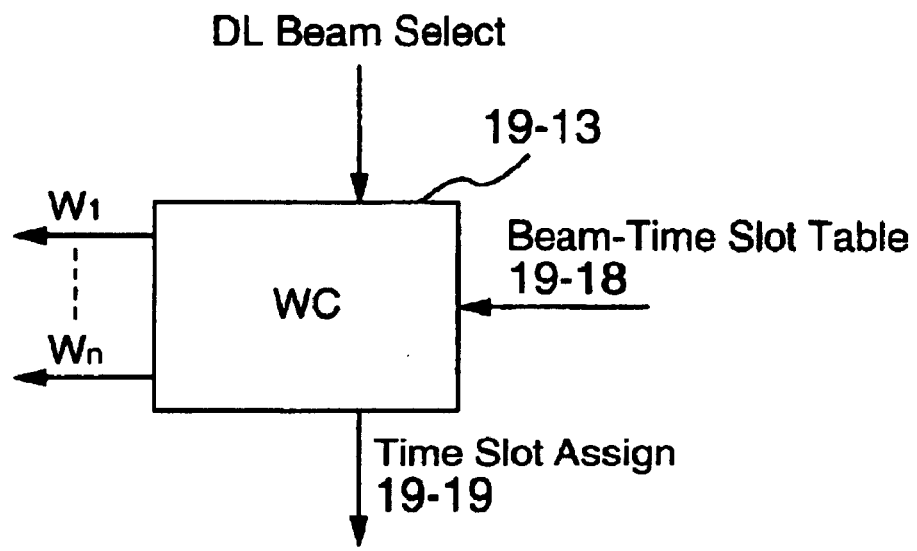
FIG. 18 is a circuit block diagram showing the detailed construction of weighting circuit (WC).

FIG. 18 shows the detailed construction of the weighting circuit (WC) 19-13. This circuit is supplied with the DL Beam Select signal and a beam-time slot table information (Beam-Time Slot Table) (as indicated in FIG. 15 by signal 19-18) for regulating the relations of the down-link beam directions and time slots to be used. The Beam-Time Slot Table information is fed from a host station or control station which will be described later. In place of supplying from that host or control station, memory means that has stored therein the Beam-Time Slot Table of the time slots to be used according to the down-link beam direction may be provided in its own base station, other base stations or control station from which the Table is fed. The weighting coefficients $W_1$–$W_n$ that fix the down-link beam directions are obtained by selecting predetermined coefficient vectors on the basis of the DL Beam Select information. The weighting coefficients $W_1$–$W_n$ can spatially control the beam pattern, sector number, beam direction and beam angle of the antenna module 19-1 of each base station as shown in the figures given above, and if necessary, they can control those values as time elapses. The WC 19-13 is required to supply to the MOD 19-10 the time slot for the down-link signal to be radiated in the selected direction. The WC 19-13 generates this time slot information as a time slot assign (Time Slot Assign) signal (as indicated in FIG. 15 by signal 19—19) on the basis of the DL Beam Select and with reference to the Beam-Time Slot Table, and supplies it to the MOD 19-10.

Figure 19:
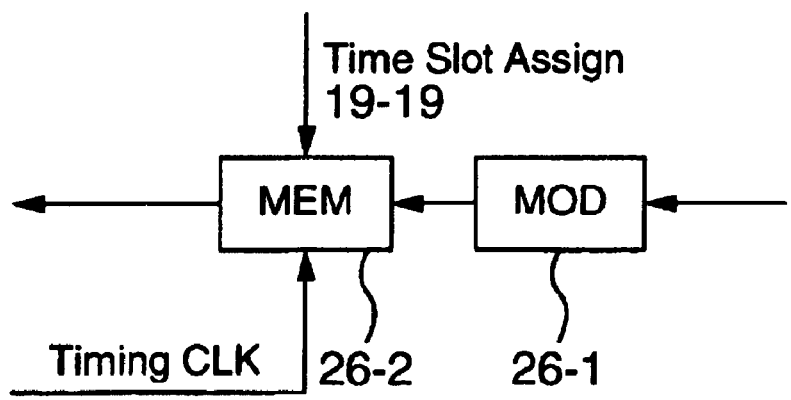
FIG. 19 is a circuit block diagram showing the detailed construction of MOD 19-10.

FIG. 19 shows the detailed construction of the MOD 19-10. The transmission signal fed from the transmitter side coder 19-9 is modulated in its amplitude and phase by a MOD 26-1, and the output signal from the MOD 26-1 is once stored in a memory 26-2. The timing of the reading-out/transmission of the signal stored in this memory is determined by the Time Slot Assign signal 19—19 fed from the weighting circuit WC 19-13. The synchronization of the time slot with the absolute time is carried out by referring to a Timing CLK 19-14 supplied from the clock generation circuit CLK.

Figure 20:
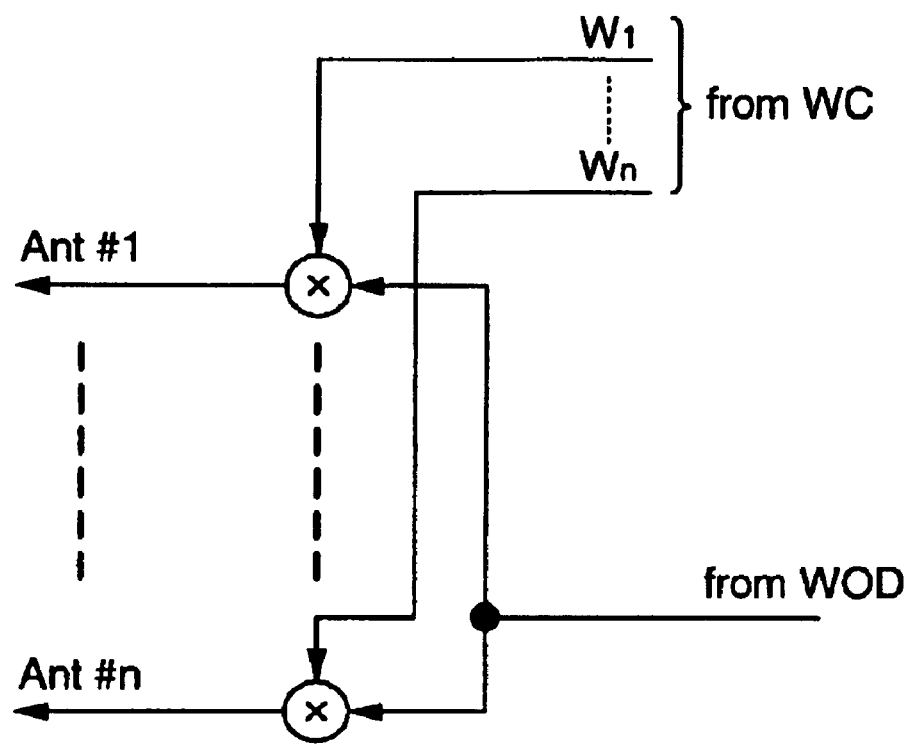
FIG. 20 is a circuit block diagram showing the detailed construction of the down-link transmitter beam forming circuit DL FBF 19-11.

FIG. 20 shows the detailed construction of the down-link fixed beam-forming circuit DL FBF 19-11. As illustrated, the signal from the MOD is weighted by the vector coefficients $W_1$–$W_n$ fed from the weighting circuit WC 19-13, and the output signals from the DL FBF 19-11 are supplied to the respective antenna elements.

The Timing CLK signal applied to the MOD 19-10 is generated from the clock generation circuit CLK 19-14. At this time, the Timing CLK is synchronized with the absolute time by referring to the time signal that is sent from a GPS satellite via the GPS receiver 19-15. Therefore, all the base stations can obtain accurate time information in synchronism with each other, and can determine the time slots A, B, C, D as for example shown in FIGS. 4 through 7 in synchronism with each other by use of this time information. The antenna directivity characteristics of all base stations can be changed in synchronism with each other by use of the time slot information.

When a failure occurs in the GPS receiver 19-15 or a GPS antenna 19-16 or GPS system itself, causing the accurate absolute time information to be difficult to receive, a highly stable free-running clock generator incorporated in the GPS receiver 19-15 is operated to generate a temporary clock signal until the failure is removed or the CLK 19-14 is forced to supply a clock signal via the signal 19-17 from the wire networks, thereby maintaining the absolute time stamp. The signal 19-17 can be chiefly used to attain the synchronization without the GPS system.

Figure 21:
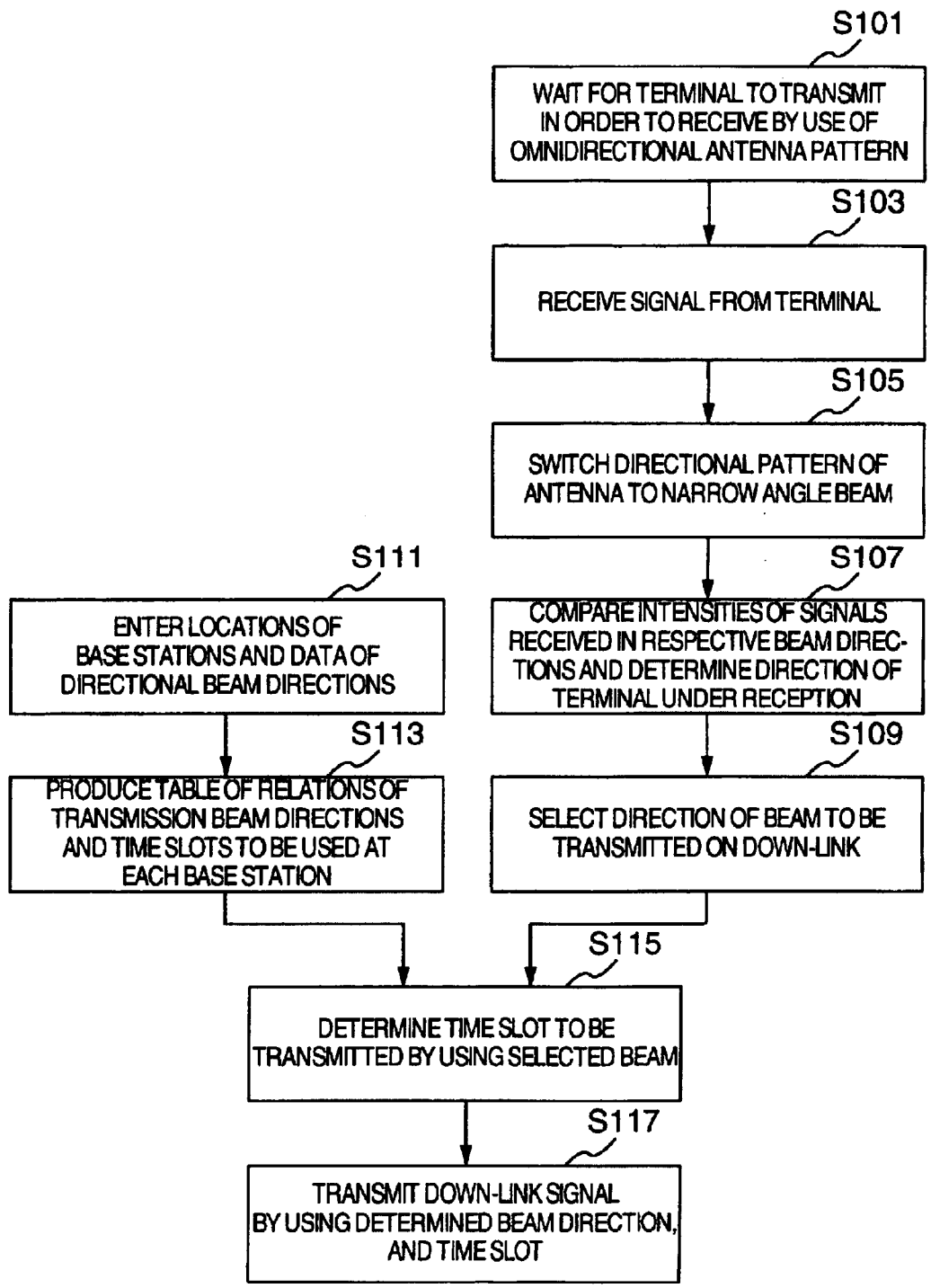
FIG. 21 is a flowchart for the down-link control according to the embodiment of the invention.

FIG. 21 is a flowchart for the down-link beam control according to the invention. As illustrated, at first, when the beams are not formed, the locations of terminals cannot be detected, and thus the receiving sides of the base stations wait for signals to come from terminals with their antennas made omnidirectional (S101). When a terminal begins to send an appropriate signal, the receiving sides of the base stations receive the signal from the terminal via their antenna module 19-1, DUP 19-2, and RX 19-3 (S103). At this time, the antenna directivity pattern is immediately switched to the narrow angle beam by use of the UL FBF 19-4 (S105). The WC 19-13 of each base station is operated to set the sector number, beam direction, and half-power angle of antenna module 19-1 according to the Beam-Time Slot Table to produce appropriate beam patterns on a spatial and time basis as shown in each of the above diagrams. Then, the signal intensities in the respective beam directions are compared with each other so that the direction in which the terminal sends the signal can be detected (S107). The weighting circuit WC 19-13 determines the direction in which the down-link beam is generated by use of this detected information (S109). On the other hand, the central apparatus, control station or the like receives the locations of base stations and the direction data of directional beams (S111), and generates the Beam-Time Slot Table that describes the relations about the directions of beams to be transmitted and the time slots to be used at each base station (S113). Then, the WC 19-13 determines the time slots in which the down-link beams are radiated with reference to the previously produced Beam-Time Slot Table of the relations about the transmission beam directions and the time slots to be used (S115), and sends them to the MOD 19-10, so that an appropriate down-link signal can be formed (S117).

This Beam-Time Slot Table can be manually produced by a system designer by use of a map and so on at the design stage for determining the locations of the base stations. The produced table that lists the relations of the down-link beam directions and the time slots is converted into digital data and stored in a system manager connected to the central apparatus of the system. This Beam-Time Slot Table may be stored within each base station or within the central apparatus of, for example, a mobile exchange or the like, so that it can be referred to, if necessary. The table peculiar to each base station, if necessary, is loaded down to each base station. When the table is provided in the central apparatus, the table information may be, if necessary, loaded down to the memory within each base station. When another new base station is added to the existing base stations after the initial design or when the locations of base stations designed are partially changed, the table can be automatically modified or a new table is produced by a self-learning function which will be described later. In addition, since this Beam-Time Slot Table shows the relations of the beam radiation directions and the time slots to be used at the time of the beam radiation of each base station, the time slots in which the radio waves should be radiated are determined by referring to this table when the direction information in which the down-link radio waves should be generated are inputted to the weighting circuit (WC) 19-13 shown in FIG. 18, and the Time Slot Assign signal is then transmitted to the memory 26-2 shown in FIG. 19, thereby enabling the radio waves to be radiated at proper timings.

Figure 27:
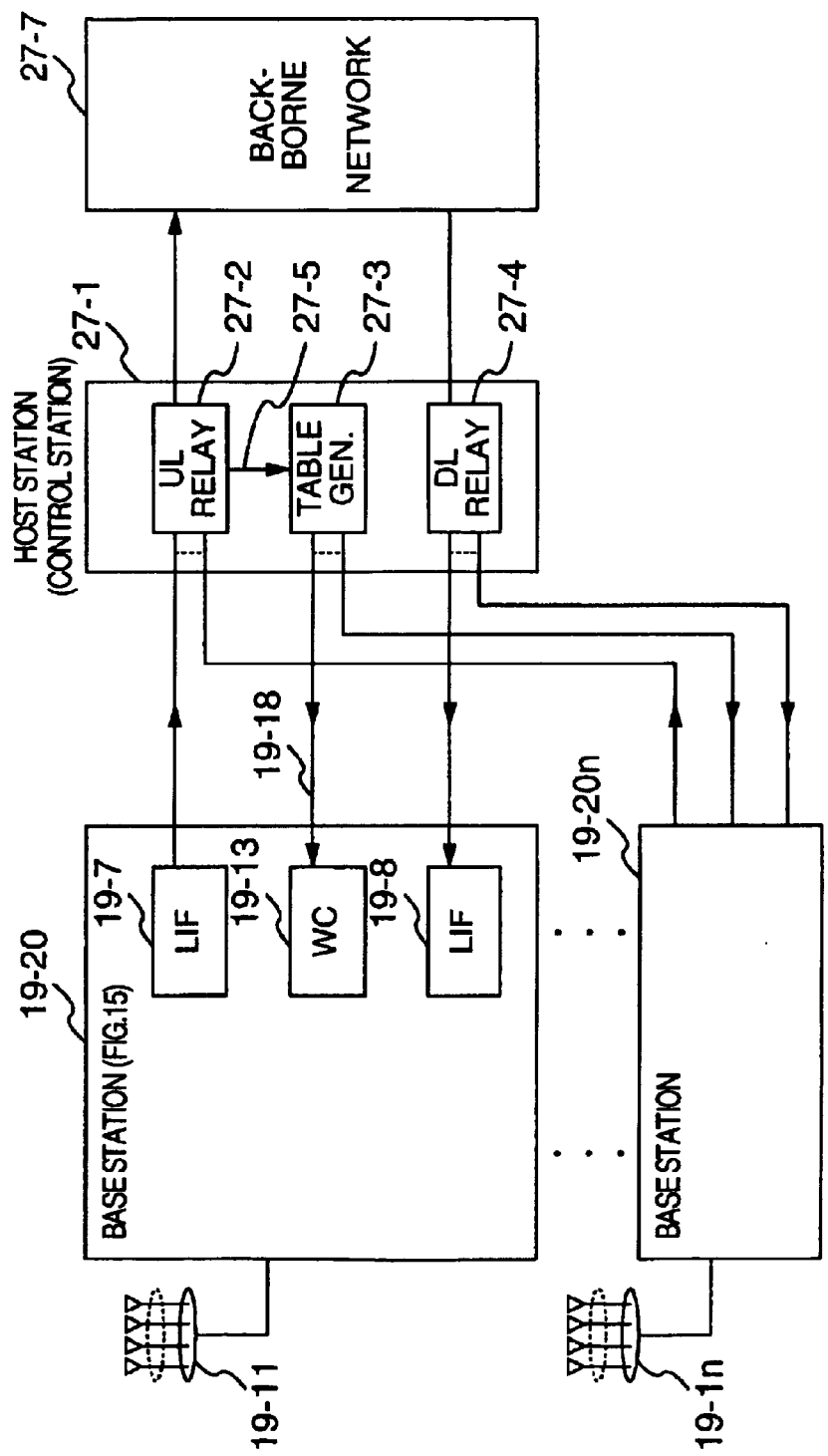
FIG. 27 is a block diagram showing a base station control system according to another embodiment of the invention.

FIG. 27 is a circuit block diagram of an example of the system for making the above construction of each base station operative. This system includes a plurality of base stations, a control station as a host station for those base stations, and a backbone network (NW) as the further host.

In FIG. 27, reference numerals 19-20, . . . , 19-20n represent the base stations shown in FIG. 15, each of which has the antenna module 19-1$_1$–19-1$_n$, the access line interface (LIF) 19-7, the weighting controller (WC) 19-13, and the access line interface (LIF) 19-8. Reference numeral 27-1 designates the host station or control station that is provided for each plurality of base stations and controls the base stations. Each host station 27-1 includes an up-link (UL) relay circuit 27-2, a table generator 27-3 for generating the table of beam time slots to be sent to each base station, and a down-link (DL) relay circuit 27-4. Reference numeral 27-7 shows the backbone network (NW). The UL relay circuit 27-2 collects the up-link signals sent from the plurality of base stations and supplies them to the backbone NW. The DL relay circuit 27-4 distributes the down-link signals to the base stations to which the terminals concerned are connected by radio.

Reference numeral 27-5 indicates an up-link (UL) traffic information transmission signal. In the circuit arrangement of FIG. 27, the traffic statistics information collected from the base stations and sent from the base stations via up-link channels to the host station, or UL relay circuit 27-2 is transmitted to the beam time slot table generator 27-3. This traffic statistics information can be obtained by accumulating DL Beam Select information, for example, shown in FIG. 17 as time elapses, and measuring the amount of traffic for each beam direction in each base station. The traffic statistics information obtained by the base stations are multiplexed on the up-link channel and sent to the host station 27-1.

FIG. 28 is an example of the beam time slot table used in the above embodiment.

The beam time slot table of FIG. 28 is used for the driving of the base stations BS1, BS2 that use 30-degree sector antennas shown in FIGS. 4 through 7. In FIG. 28, the directivity characteristics of antennas are given values of angle relative to the time slots A, B, C and D. The time slots A, B, C and D correspond to the conditions shown in FIGS. 4, 5, 6 and 7, respectively. The beam slot generator 27-3 sends the table information shown in FIG. 28 to each base station or orders each base station to use the table information.

As one example, this beam time slot table is previously set on the basis of geometrical information when the base stations are initially provided, and used without modification. As another example, weighting can be made for increasing the number of times that the corresponding beam is directed by observing the traffics of base stations on a long-term basis for each antenna direction, measuring the directionally localized distribution of traffic at each base station, and comparing the value for the direction in which a high traffic is required with that for the direction in which a low traffic is required.

The traffic measurement for each slot can be made by accumulating the DL Beam Select information shown, for example, in FIG. 17 for a long time and grasping the traffic localization for each direction.

In order to increase the rate of time of beam radiation in the direction of high traffic, it is necessary to increase the number of time slots in the table of, for example, FIG. 28 that shows four time slots, and to use a plurality of time slots for the high-traffic direction.

FIG. 29 shows an example of the beam time slot table with the beam radiation repetition increased for high-traffic direction. For example, let it be assumed that a high traffic occurs at area 7-4 in FIG. 4. The base stations BS1 and BS2 radiate beams toward this area on the time slots of FIGS. 4 and 7. Thus, if, as shown in FIG. 29, time slots E and F are added so that the same beam radiation patterns as the time slots A and D are generated by the added slots, the repetitions of the beams radiation to the high-traffic area ate increased statistically.

When the traffic is increased in another direction, the beam pattern selection is changed on this table. In this case, two cases can be considered for the repetition change. That is, the repetition to be changed is increased in order to support the instantaneous increase of traffic or reduced by use of the results of long-term observation. The frequency and transition time of this change is determined by the actual traffic change characteristics.

Figure 22:
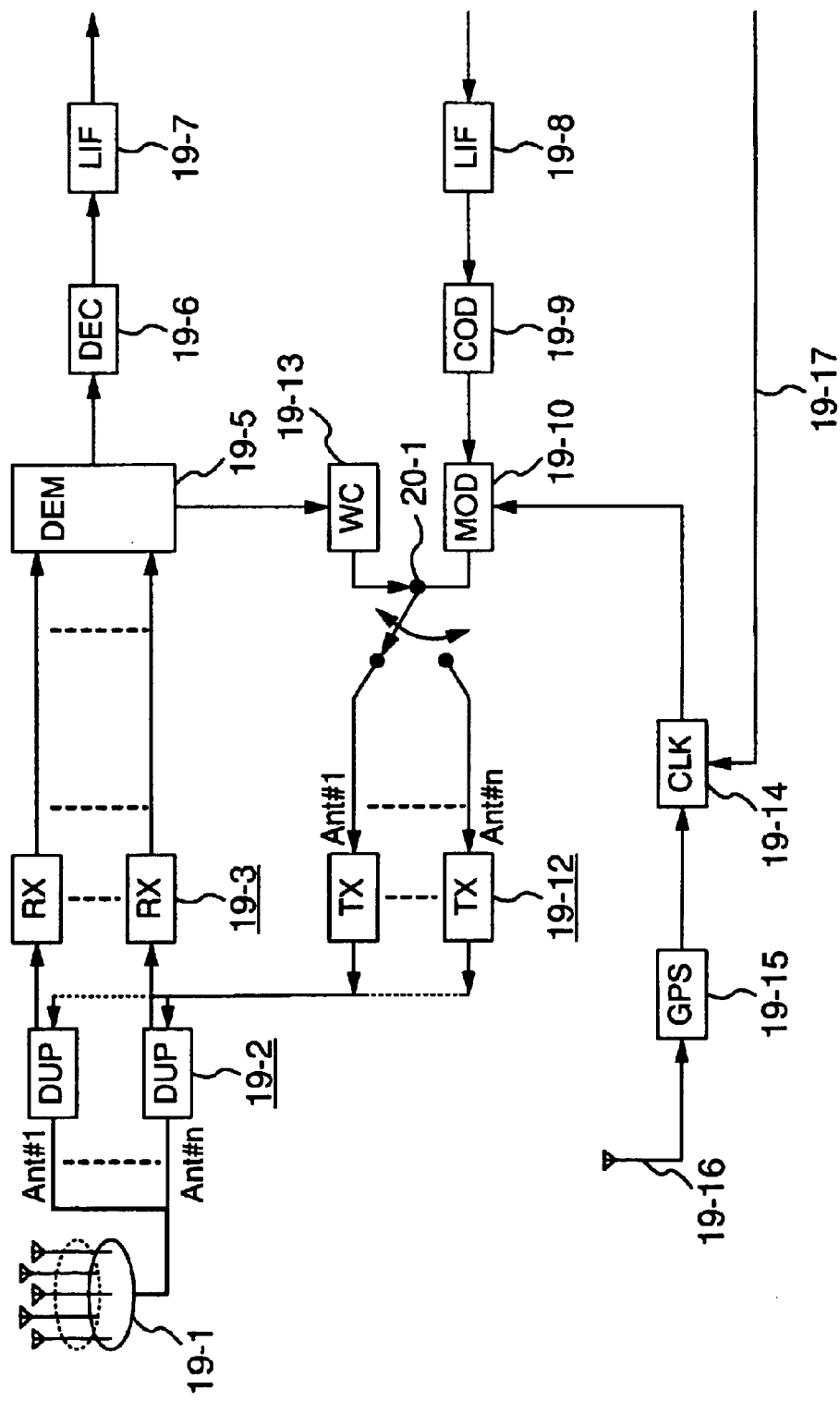
FIG. 22 is a circuit block diagram showing the construction of the base station according to the second embodiment of the invention.
Figure 23:
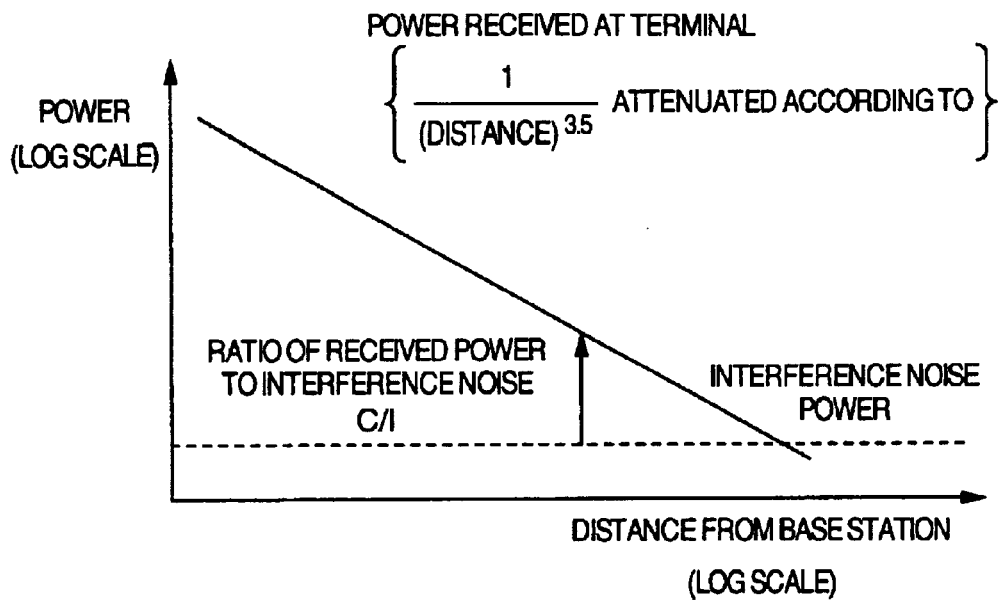
FIG. 23 is an illustration of the fundamental principle of HDR system.

FIG. 22 is a block diagram of the construction of the second embodiment of the base station according to the invention. In this embodiment, a mere through circuit on the up-link side and an antenna selection switch 20-1 on the down-link side are used in place of the UL FBF 19-4 and DL FBF 19-11 of the first embodiment. This selection switch 20-1 can be controlled by the weighting circuit 19-13 to select an antenna that is directed in the direction in which a desired terminal exists. Of the beam-forming circuits 19-4, 19-11, for example, the circuit 19-4 on the up-link is originally intended for making vector addition of the output signals from the antenna elements of the antenna array as the phase and amplitude are controlled, to form an antenna pattern of an arbitrary half-power-angle. However, if the antenna elements themselves have half-power angles that meet the object of the invention, desired characteristics can be achieved without making vector addition in the beam forming circuits.

The description of the above embodiments have been made on the assumption that the respective base stations are disposed precisely at the vertices of each triangle or square, and that the directions in which the radio waves should be radiated on the respective time slots are previously determined. However, in practice it is often difficult to dispose the vertices of an exact triangle or square, and when base stations are additionally disposed, it may be necessary to change the relations of the time slots and the radio wave radiation directions that were initially set. A description will be made of a modification considering this case, or a method of determining the optimum radio wave radiation directions as the base stations execute self-learning.

A method for achieving the above self-learning function will be described with reference to the embodiment as, for example, shown in FIG. 15. As illustrated, on the up-link of the base station, the DEM 19-15 is used to select a received beam from an arbitrary terminal from which the best receiving condition can be obtained, or to detect the direction in which the terminal of the best receiving condition exists. Then, this terminal is forced to report the receiving condition of the down-link at its position. In other words, the terminal receives a pilot signal from each terminal, and reports to each base station which one of the received beams has given the best receiving condition. It is now assumed that although the base station under consideration does not yet determine the relations of the time slots and the radio wave radiation directions, the base stations on the periphery of that station have already set those relations. In this case, since the peripheral base stations have already been radiating radio waves in different directions on the respective time slots, the terminal that is now measuring the quality of the down-link is able to discriminate time slots on which the radio waves from some of other base stations can be received with high levels and the other time slots on which the radio waves from the other base stations are not so strong. Therefore, the terminal can know which one of the neighboring base stations is sending strong time slots that much interfere with at its current position, and conversely can report to the base station which one or ones of the slots relatively less interfere with.

The measurements of the intensities of the interfering radio waves on each time slot have possibilities of changing depending on the traffic conditions of the neighboring base stations. Accordingly, the base station that is now making self-learning can observe the report from each terminal for a constant period of time to obtain statistics information, thereby supposing which time slot should be used in order to most reduce the interference with other base stations when the radio wave is radiated in the direction of the desired terminal on that time slot. The result of this assumption will of course modify the table of the relations of the beam directions and the time slots, which is previously stored in the central apparatus or base station. The measurement of radio wave interference with other base stations can be made about the intensities of radio waves themselves or by observing the number of times that error occurs when data is actually transmitted for communication.

Thus, according to the invention, the radio waves radiated from the base stations can be prevented from interfering with each other in the boundary regions particularly between the cells or sectors of the HDR system, making it difficult to communicate at a sufficiently high bit rate. In addition, according to the invention, the regions in which the sector beams are not directed can be made small in order that a wider range of service area can be achieved. Moreover, according to the invention, a plurality of sector beams can be prevented as completely as possible from interfering with each other so that the service disabled region expands into the service region.

Also, according to the invention, the directions in which radio waves are radiated at the same time from the respective base stations on, for example, the down-link of HDR system can be determined in order to give the least interference with each other and satisfactory radio signals that always less interfere with each other can be received even if any terminal exists anywhere in the service area. Thus, according to the invention, it is possible to most effectively use one of the features of the HDR, or the fact that communications with high bit rates can be made when the radio waves less interfere with each other.

What is claimed is:

1. A wireless communication method for base stations each having a plurality of antenna elements to communicate with wireless terminals, comprising the steps of:

receiving signals from said wireless terminals via said antenna elements from which the received signals can be synthesized and to which the transmission signals can be synthesized to form an antenna directivity of certain beam patterns;

synthesizing said signals received from said antenna elements to form said antenna directivity of said certain beam pattern;

selecting one of said received signals from said wireless terminals on the basis of said synthesized received signals of different directivities and determining transmission beam direction information for use in directing the beam in the direction of said selected signal;

estimating a transmission beam slot on the basis of said determined beam direction information, and a table of the relations of transmission beam directions and time slots on which said radio beams are radiated in those directions; and transmitting a down-link signal on said estimated transmission beam time slot from said antenna elements controlled.

2. A method according to claim 1, wherein said plurality of base stations are disposed at the vertices of each triangle, and said formed antenna beam pattern of each base station is of 120 degree coordinated three-sector type in which three sector beam directions are identically located each other among said plurality of base stations.

3. A method according to claim 1, wherein said plurality of base stations are disposed at the vertices of each square, and said formed beam pattern of said antenna elements of each base station is of rectangular coordinated four-sector type in which radiation direction of each sector beams are shifted 45 degrees from those of adjacent said base stations.

4. A method according to claim 1, wherein said plurality of antenna elements provided in each base station to radiate a beam at a certain angle are controlled to radiate the beam a plurality of times with their radiation angles circularly shifted a certain angle at a time as time elapses so as to scan the periphery around said base station.

5. A method according to claim 2, wherein said antenna elements of each base station are controlled so that as a first arrangement of beam patterns, said beam patterns of said base stations are alternately changed in their sector direction to be 180 degree upside down among adjacent said base stations of odd rows of said base stations, but are all the same direction along each one of even rows of said base stations, and that as a second arrangement of beam patterns, said beam patterns of said base stations are all the same direction along each one of odd rows of said base stations, but alternately changed in their sector direction to be 180 degree upside down along each one of even rows of said base stations, and said beam patterns of said base stations are alternately changed as above by first and second time slots.

6. A method according to claim 1, further comprising the steps of:

receiving said signals from said wireless terminals by said antenna elements of which the directivity is omnidirectional;

detecting the directions of said wireless terminals from which the signals have been received; and determining a down-link beam direction on the basis of said detection of said directions.

7. A method according to claim 1, wherein a synchronizing clock is supplied to said base stations from a GPS system.

8. A method according to claim 1, further comprising the steps of:

estimating weighting coefficients for determining said beam patterns and transmission beam directions on the basis of said determined transmission beam direction information; and controlling said antenna elements to transmit down-link signals by use of said obtained beam patterns, beam directions and transmission beam time slots.

9. A method according to claim 1, further comprising the step of synchronizing the operations, and radiation of said base stations with each other by use of said table of said base stations.

10. A wireless communication system for a plurality of base stations to communicate with wireless terminals, each base station comprising:

an antenna having a plurality of antenna elements, the received signals from which, and the transmitted signals to which are respectively synthesized to form an antenna directivity having certain beam patterns;

a circuit for receiving signals from said wireless terminals via said antenna;

a circuit for synthesizing said signals from said antenna elements according to said antenna directivity of said certain beam pattern;

a circuit for selecting one of said received signals from said wireless terminals on the basis of said synthesized received signals of different directivities, and determining transmission beam direction information for use in directing the beam in said selected direction;

a circuit for generating transmission time slots on the basis of said transmission beam direction information from said decision circuit and an information table that shows the relations of transmission beam directions and beam time slots for use in radiating beams in those directions; and a circuit for transmitting a down-link signal on said generated transmission beam time slot from said antenna controlled.

11. A system according to claim 10, wherein said base station further includes a circuit for synchronizing with the other base stations for the timing of radiation on the basis of said table.

12. A system according to claim 10, wherein said table is previously generated according to the attribute of the location of said base station, and changeably maintained in said base station.

13. A system according to claim 12, wherein said base station further includes a circuit for receiving the contents of said table from a host station of said base station.

* * * * *